(12) United States Patent
Sakai et al.

(10) Patent No.: US 10,454,621 B2
(45) Date of Patent: Oct. 22, 2019

(54) COMMUNICATION CONTROL DEVICE, INFORMATION PROCESSING DEVICE, INFORMATION PROCESSING METHOD, AND PROGRAM

(71) Applicant: SONY CORPORATION, Tokyo (JP)

(72) Inventors: Eisuke Sakai, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 15/578,298

(22) PCT Filed: May 6, 2016

(86) PCT No.: PCT/JP2016/063640
§ 371 (c)(1),
(2) Date: Nov. 30, 2017

(87) PCT Pub. No.: WO2017/010149
PCT Pub. Date: Jan. 19, 2017

(65) Prior Publication Data
US 2018/0145793 A1    May 24, 2018

(30) Foreign Application Priority Data

Jul. 10, 2015 (JP) ................................. 2015-138970

(51) Int. Cl.
*H04L 1/16* (2006.01)
*H04L 29/08* (2006.01)
(Continued)

(52) U.S. Cl.
CPC ............ *H04L 1/1621* (2013.01); *H04L 29/08* (2013.01); *H04L 29/08594* (2013.01);
(Continued)

(58) Field of Classification Search
None
See application file for complete search history.

(56) References Cited

U.S. PATENT DOCUMENTS

2003/0169761 A1* 9/2003 Duncan ............... H04L 41/0213
  370/449
2005/0239411 A1* 10/2005 Hazra ................... H04L 1/0021
  455/67.11
(Continued)

FOREIGN PATENT DOCUMENTS

JP  2010-517436 A  5/2010
JP  2014-53832 A  3/2014
(Continued)

OTHER PUBLICATIONS

Tomoya Tandai, et al., "Evaluation of effectiveness of link adaptation in channel search to guarantee Quality of Service of real-time data transmission in Wireless Local Area Network," IEICE Technical Report, NS2004-58, vol. 104, No. 183, Jul. 8, 2004, (26 pages) (with English abstract and translation).

(Continued)

*Primary Examiner* — Hassan A Phillips
*Assistant Examiner* — Gautam Sharma
(74) *Attorney, Agent, or Firm* — Xsensus LLP

(57) ABSTRACT

A communication control device includes a control unit. The control unit included in the communication control device performs control to notify an information processing device of a period for the information processing device to acquire information regarding a communication state in the information processing device. The control unit included in the communication control device further performs control to cause the information processing device to notify the information regarding the communication state acquired in the period and to determine a destination of a delivery confirmation request on the basis of the information regarding the (Continued)

communication state. Thereby, a destination of a delivery confirmation request can be appropriately determined.

20 Claims, 16 Drawing Sheets

(51) Int. Cl.
*H04W 4/06* (2009.01)
*H04W 4/08* (2009.01)
*H04W 24/10* (2009.01)
*H04W 28/04* (2009.01)
*H04W 84/12* (2009.01)

(52) U.S. Cl.
CPC ............ *H04L 67/142* (2013.01); *H04W 4/06* (2013.01); *H04W 4/08* (2013.01); *H04W 24/10* (2013.01); *H04W 28/04* (2013.01); *H04W 84/12* (2013.01); *H04L 1/16* (2013.01)

(56) References Cited

U.S. PATENT DOCUMENTS

| | | | |
|---|---|---|---|
| 2005/0250495 A1 | 11/2005 | Black et al. | |
| 2006/0045045 A1* | 3/2006 | Blessent | H04W 52/343 |
| | | | 370/328 |
| 2007/0189237 A1* | 8/2007 | Jaatinen | H04B 7/2656 |
| | | | 370/335 |
| 2008/0181159 A1 | 7/2008 | Metzler et al. | |
| 2012/0297223 A1* | 11/2012 | Wu | H04W 52/0212 |
| | | | 713/320 |
| 2013/0044702 A1* | 2/2013 | Jayaraman | H04W 48/06 |
| | | | 370/329 |
| 2014/0098735 A1 | 4/2014 | Metzler et al. | |
| 2014/0133303 A1 | 5/2014 | Jia et al. | |
| 2015/0063137 A1* | 3/2015 | Shen | H04W 24/10 |
| | | | 370/252 |
| 2015/0334677 A1* | 11/2015 | Patil | H04W 4/025 |
| | | | 455/456.1 |

FOREIGN PATENT DOCUMENTS

| | | |
|---|---|---|
| WO | 02/093839 | 11/2002 |
| WO | 2011/130344 | 10/2011 |
| WO | 2014/078017 A1 | 5/2014 |

OTHER PUBLICATIONS

International Search Report dated May 31, 2016 in PCT/JP2016/063640 filed May 6, 2016.
Extended European Search Report dated Oct. 16, 2018 in European Application No. 16824130.5-1218.

* cited by examiner

FIG. 4

EXEMPLARY CONFIGURATION OF INFORMATION REGARDING
STATISTICAL INFORMATION MEASURING PERIOD

| 301 | 302 | 303 | 304 |
|---|---|---|---|
| STATISTICAL START TIME | STATISTICAL PERIOD | INTERVAL TO RESTART OF STATISTICS | THE NUMBER OF TIMES OF STATISTICAL MEASUREMENT |

Octets: 8     2     2     2

FIG. 5

INFORMATION REGARDING STATISTICAL
INFORMATION NOTIFYING PERIOD

| 311 | 312 |
|---|---|
| STATISTICAL INFORMATION NOTIFICATION START TIME | STATISTICAL INFORMATION NOTIFYING PERIOD |

Octets: 8     2

EXEMPLARY CONFIGURATION OF INFORMATION TO BE NOTIFIED TO AP

EXEMPLARY CONFIGURATION OF Alert frame

EXEMPLARY CONFIGURATION OF Alert frame

EXEMPLARY COMMUNICATION

EXEMPLARY COMMUNICATION USING Stat End frame

EXEMPLARY OPERATION OF AP

EXEMPLARY OPERATION OF STA

EXEMPLARY COMMUNICATION USING
Stat Initiate frame AND Stat End frame

EXEMPLARY COMMUNICATION USING Stat Initiate frame

COMMUNICATION CONTROL DEVICE, INFORMATION PROCESSING DEVICE, INFORMATION PROCESSING METHOD, AND PROGRAM

TECHNICAL FIELD

The present technology relates to a communication control device. More specifically, the present technology relates to a communication control device, an information processing device, and an information processing method for exchanging information using wireless communication and a program for causing a computer to execute the method.

BACKGROUND ART

Conventionally, in a wireless local area network (LAN) system, a propagation loss, shadowing, fading, collision of frames or the like may occur, and thus a phenomenon in which a receiver fails to receive a frame transmitted from a transmitter may occur. To cope with such a phenomenon, there are cases where retransmission control using acknowledgment (ACK) and negative acknowledgment (NACK) are employed in some cases in a wireless LAN system. In a retransmission control technique using a response from a receiving side, there are cases where a delivery acknowledgment including information indicating success or failure of data reception is returned from the receiving side in response to a delivery confirmation request from a data transmitting side. As one of the above, there is retransmission control using a Block ACK Request (BAR) frame and a Block ACK (BA) frame that enables collective execution of reception confirmation of one or more transmission frames.

Here, IEEE802.11aa, which is one of the standards related to the wireless LAN defines technology for performing retransmission control using a BAR and a BA between a master device (access point (AP)) and a slave device (station (STA)). Specifically, a technique is defined in which an AP unicasts a BAR to a plurality of STAs belonging to a multicast group and receives a BA from an STA to perform retransmission control related to multicasting. According to the present technology, in a case where the number of STAs belonging to a multicast group is small, a highly reliable wireless communication environment can be implemented for example with the AP transmitting a BAR to all the STAs and receiving a BA from all the STAs. However, in a case where the number of STAs belonging to a multicast group is large, a throughput may be deteriorated due to an overhead of transmission and reception of BARs and BAs.

With respect to the technique described above, for example, a technique is disclosed in which STAs of a multicast group are grouped, and transmission and reception of a BAR and a BA are performed only on a representative terminal set for each group (for example, see Patent Document 1).

CITATION LIST

Patent Document

Patent Document 1: Japanese Patent Application Laid-Open No. 2014-53832

SUMMARY OF THE INVENTION

Problems to be Solved by the Invention

In the conventional technology described above, strict grouping and selection of representative terminals are performed. Therefore, for example, in a case where the reception environment of an STA varies, it is difficult to prevent deterioration of throughput without re-grouping. Moreover, high overhead is indispensable for redoing grouping.

The present technology has been created in view of such circumstances with an object of appropriately determining a destination of a delivery confirmation request.

Solutions to Problems

The present technology has been devised in order to solve the above problems. A first aspect of the present technology includes a communication control device, including a control unit for performing control to notify an information processing device of a period for the information processing device to acquire information regarding a communication state in the information processing device, to cause the information processing device to notify the information regarding the communication state acquired in the period, and to determine a destination of a delivery confirmation request on the basis of the information regarding the communication state, an information processing method thereof, and a program causing a computer to execute the method. This results in an effect that the information processing device is notified of the period, the information regarding the communication state acquired in the period is notified from the information processing device, and that a destination of a delivery confirmation request is determined on the basis of the information regarding the communication state.

Moreover, in the first aspect, the control unit may perform control to cause the information processing device to transmit the information regarding the communication state in a case where the information processing device determines that the information regarding the communication state acquired in the period satisfies a predetermined condition. This results in an effect of causing an information processing device, in which the information regarding the communication state acquired in the period satisfies the predetermined condition, to transmit the information regarding the communication state thereof.

Furthermore, in the first aspect, at least one piece of information regarding the communication state acquired in the period may be a reception characteristic in the information processing device, and the control unit may cause the information processing device to determine whether the reception characteristic in the information processing device satisfies a predetermined condition and, in a case where the reception characteristic satisfies the predetermined condition, may cause the information processing device to transmit the information regarding the communication state. This results in an effect that the information processing device is caused to determine whether the reception characteristic in the information processing device satisfies the predetermined condition on the basis of the information regarding the communication state acquired in the period, and only in a case where the reception characteristic satisfies the predetermined condition, the information processing device is caused to transmit the information regarding the communication state.

Furthermore, in the first aspect, the control unit may perform control to notify the information processing device of period information for specifying a start and an end of the period. This results in an effect of notifying the information processing device of the period information for specifying the start and the end of the period.

Moreover, in the first aspect, the control unit may notify the information processing device, as the period information, of at least one of start time of the period and a sequence number for starting the period and at least one of the period and end time of the period. This results in an effect that at least one of start time of the period and a sequence number for starting the period and at least one of the period and end time of the period are notified to the information processing device as the period information.

Moreover, in the first aspect, the control unit may perform control to notify the information processing device of notification period information for specifying a notification period during which the information processing device can notify the communication control device of the information regarding the communication state. This results in an effect that the notification period information is notified to the information processing device.

Moreover, in the first aspect, the control unit may notify, as the notification period information, the information processing device of start time of the notification period and at least one of a duration of the notification period and end time of the notification period. This results in an effect that start time of the notification period and at least one of a duration of the notification period and end time of the notification period is notified to the information processing device as the notification period information.

Furthermore, in the first aspect, the control unit may perform control to allow information regarding a reception characteristic in the information processing device to be notified as the information regarding the communication state. This results in an effect that the information regarding the reception characteristic in the information processing device is notified.

Furthermore, in the first aspect, the information regarding the reception characteristic may be at least one of a throughput, a packet loss rate, the number of multicast packets successfully received by the information processing device and addressed to the multicast group to which the information processing device belongs, and the ratio of the sum of noise power and interference power relative to a desired signal power. This results in an effect that at least one of the above is notified.

Furthermore, in the first aspect, the control unit may perform control to notify the information processing device of an identifier of an index indicating a reception characteristic in the information processing device, the identifier being information for specifying the information regarding the communication state. This results in an effect that the identifier of the index indicating the reception characteristic in the information processing device, the identifier being information for specifying the information regarding the communication state, is notified to the information processing device.

Moreover, in the first aspect, the control unit may perform control to include at least one of the information regarding the period, information for specifying the information regarding the communication state, and notification period information for specifying a notification period during which the communication control device can be notified in a Radio Measurement Request frame or a part of a concatenated frame in which a plurality of frames are concatenated to transmit the information to the information processing device. This results in an effect that at least one of the information regarding the period, information for specifying the information regarding the communication state, and notification period information for specifying a notification period during which the communication control device can be notified is included in a radio measurement request frame or apart of a concatenated frame in which a plurality of frames are concatenated and transmitted to the information processing device.

Moreover, a second aspect of the present technology includes an information processing device including a control unit for performing control to transmit, to a communication control device, information regarding a communication state in the information processing device acquired in a period notified from the communication control device, an information processing method thereof, and a program for causing a computer to execute the method. This results in an effect that the information regarding the communication state in the information processing device acquired in the period notified from the communication control device is transmitted to the communication control device.

Moreover, in the second aspect, the control unit may transmit the information regarding the communication state to the communication control device in a case where the acquired information regarding the communication state satisfies a predetermined condition. This results in an effect that the information regarding the communication state is transmitted to the communication control device in the case where the acquired information regarding the communication state satisfies the predetermined condition.

Furthermore, in the second aspect, the control unit may include, as the information regarding the communication state, information regarding a reception characteristic in the information processing device. This results in an effect of including the information regarding the reception characteristic in the information processing device.

Furthermore, in the second aspect, the information regarding the reception characteristic may be one of a value corresponding to an index indicating a reception characteristic in the information processing device and a value corresponding to an identifier of the index. This results in an effect that one of a value corresponding to an index indicating a reception characteristic in the information processing device and a value corresponding to an identifier of the index is transmitted.

Furthermore, in the second aspect, the control unit may perform control to include the information regarding the communication state in a Radio Measurement Report frame or a Block Ack frame to transmit the information to the communication control device. This results in an effect that the information regarding the communication state is included in a Radio Measurement Report frame or a Block Ack frame to be transmitted to the communication control device.

Effects of the Invention

According to the present technology, an excellent effect that it is possible to appropriately determine a destination of a delivery confirmation request can be achieved. Note that effects described herein are not necessarily limited. Anyone of the effects described in the present disclosure may be included.

BRIEF DESCRIPTION OF DRAWINGS

FIG. 4 is a diagram illustrating an exemplary configuration of information regarding a statistical information measuring period transmitted by the AP 100 according to the first embodiment of the present technology.

FIG. 5 is a diagram illustrating an exemplary configuration of information regarding a statistical information notifying period transmitted by the AP 100 according to the first embodiment of the present technology.

MODE FOR CARRYING OUT THE INVENTION

Embodiments for carrying out the present technology (hereinafter referred to as "embodiments") will be described below. Note that in the present specification and the drawings, components having substantially the same functional configuration are denoted by the same symbol, thereby omitting redundant explanations.

Alternatively, in this specification and the drawings, elements having substantially the same functional configuration may be distinguished by adding different alphabets after the same symbol. For example, a plurality of elements having substantially the same functional configuration are distinguished as necessary such a manner as wireless communication devices 100A, 100B, and 100C. Note that in a case where it is not necessary to particularly distinguish each of a plurality of elements having substantially the same functional configuration, they are denoted by only the same symbol. For example, in a case where it is not necessary to particularly distinguish the wireless communication devices 100A, 100B, and 100C, they are simply referred to as wireless communication devices 100.

Descriptions will be given in the following order.
1. First embodiment (example in which AP transmits Stat End frame to STA)
2. Second embodiment (example in which AP transmits Stat Initiate frame and Stat End frame to STA)
3. Third embodiment (example in which AP transmits Stat Initiate frame to STA)
4. Application example <1. First Embodiment>

[Exemplary Configuration of Wireless Communication System]

Figure 1:
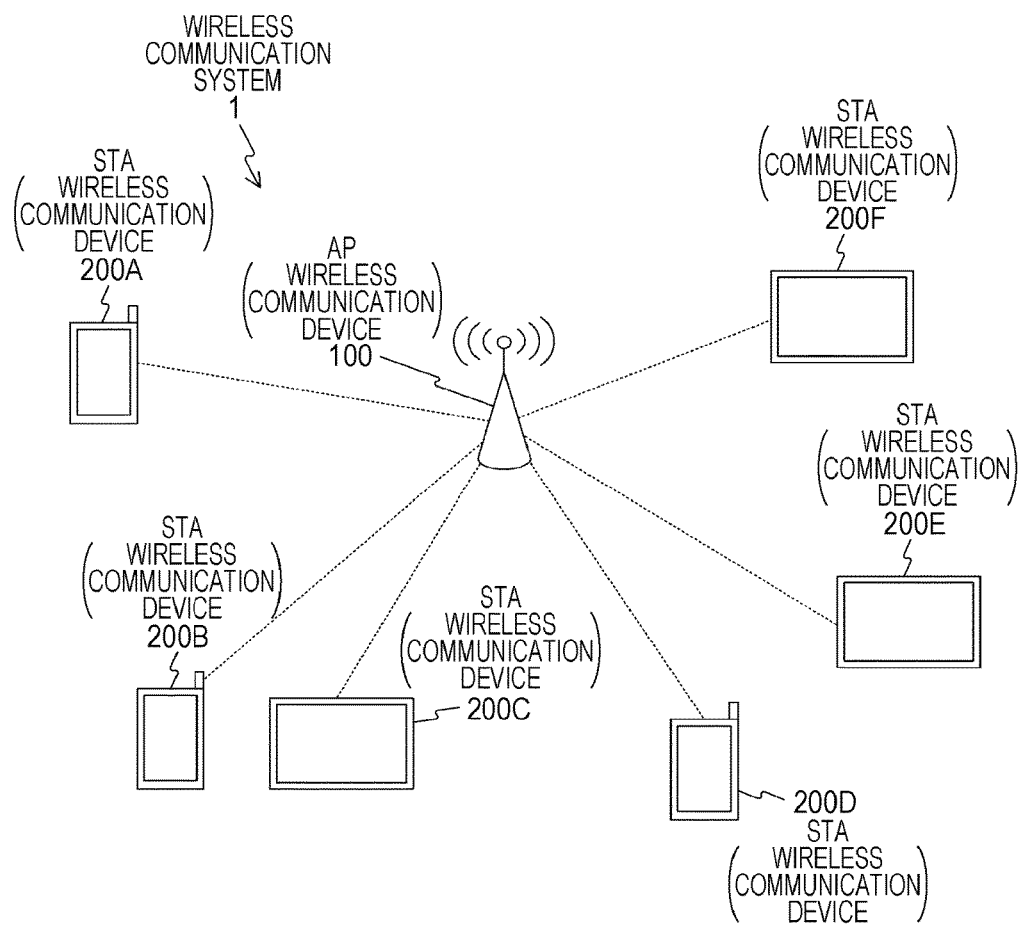
FIG. 1 is a diagram illustrating an example of the overall configuration of a wireless communication system 1 according to a first embodiment of the present technology.

FIG. 1 is a diagram illustrating an example of the overall configuration of a wireless communication system 1 according to a first embodiment of the present technology. As illustrated in FIG. 1, the wireless communication system 1 includes a wireless communication device 100 and a plurality of wireless communication devices 200. Note that in the following description, the wireless communication device 100 may be also referred to as an AP 100 and the wireless communication devices 200 may be also referred to as STAs 200 in some cases. Note that the wireless communication device 100 is an example of a communication control device described in the claims. Moreover, the wireless communication device 200 is an example of an information processing device described in the claims.

The wireless communication device 100 is an access point (AP) that provides a wireless communication service to the plurality of wireless communication devices 200 connected to the wireless communication device 100. The wireless communication devices 200 are stations (STAs) that are connected to the wireless communication device 100 and perform wireless communication. In the example illustrated in FIG. 1, STAs 200A, 200B, and 200D are smartphones, and STAs 200C, 200E, and 200F are tablet terminals. Communication from the AP 100 to the STA 200 is referred to as downlink (DL), and communication from the STA 200 to the AP 100 is referred to as uplink (UL).

Note that transmitting a frame with a single STA as a destination is referred to as unicasting. Moreover, transmitting a frame with a plurality of STAs belonging to a group as destinations is referred to as multicast.

For example, the AP 100 and each of the STAs 200A to 200F are connected via wireless communication and directly transmit and receive frames. It is assumed that the STAs 200A to 200F belong to a single multicast group, and the AP 100 performs multicasting to the STAs 200A to 200F. It is further assumed that the AP 100 has completed preparations for transmitting and receiving a Block Ack Request (BAR) and a Block Ack (BA) by transmitting and receiving an ADDBA request and an ADDBA response to and from the STAs 200A to 200F. As a result, the STAs 200A to 200F all receive a BAR and caused to be in a state where they can return a BA. Hereinafter, unless otherwise mentioned, it is assumed that the STAs 200 belong to a single multicast group and have completed preparations for transmitting and receiving a BAR and a BA.

[Exemplary Configuration of AP]

Figure 2:
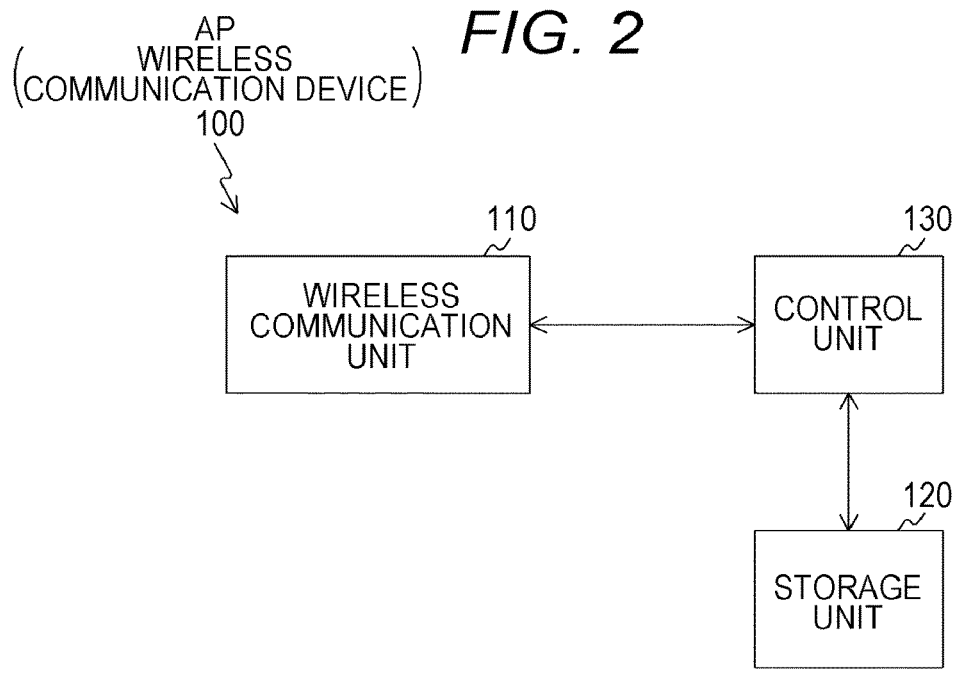
FIG. 2 is a block diagram illustrating an example of a logical configuration of an AP 100 according to the first embodiment of the present technology.

FIG. 2 is a block diagram illustrating an example of a logical configuration of the AP 100 according to the first embodiment of the present technology. As illustrated in FIG. 2, the AP 100 includes a wireless communication unit 110, a storage unit 120, and a control unit 130.

The wireless communication unit 110 is a wireless communication interface that mediates wireless communication with other devices by the AP 100. In an embodiment of the present technology, the wireless communication unit 110 performs wireless communication with the STA 200. For example, the wireless communication unit 110 receives a radio signal transmitted from an STA 200. The wireless communication unit 110 may further have functions as an amplifier, a frequency converter, a demodulator, and other devices. For example, the wireless communication unit 110 may output received data to the control unit 130. Furthermore, the wireless communication unit 110 transmits a radio signal to the STA 200 via an antenna. The wireless communication unit 110 may have functions as a modulator, an amplifier, and other devices. For example, the wireless communication unit 110 may transmit data output from the control unit 130 after performing modulation, power amplification, and other processing.

Furthermore, the wireless communication unit 110 performs multicasting to the STA 200. The wireless communication unit 110 further transmits a BAR to an STA as a destination of the BAR determined by the control unit 130 and receives a BA. Note that a BA includes a BA bitmap (delivery acknowledgment bitmap) indicating success or failure of reception of a series of multicast packets. The multicast packets here refer to multicast packets addressed to the multicast group to which the STAs 200 belong. Furthermore, the wireless communication unit 110 transmits and receives various messages for flexibly changing a destination of the BAR to and from each of the STAs 200.

The storage unit 120 is a part for recording and reproducing data on a predetermined recording medium. For example, the storage unit 120 stores information indicating a destination of a BAR determined by the control unit 130.

The control unit 130 functions as an arithmetic processing device and a control device and controls the overall operation in the AP 100 according to various programs.

Figure 12:
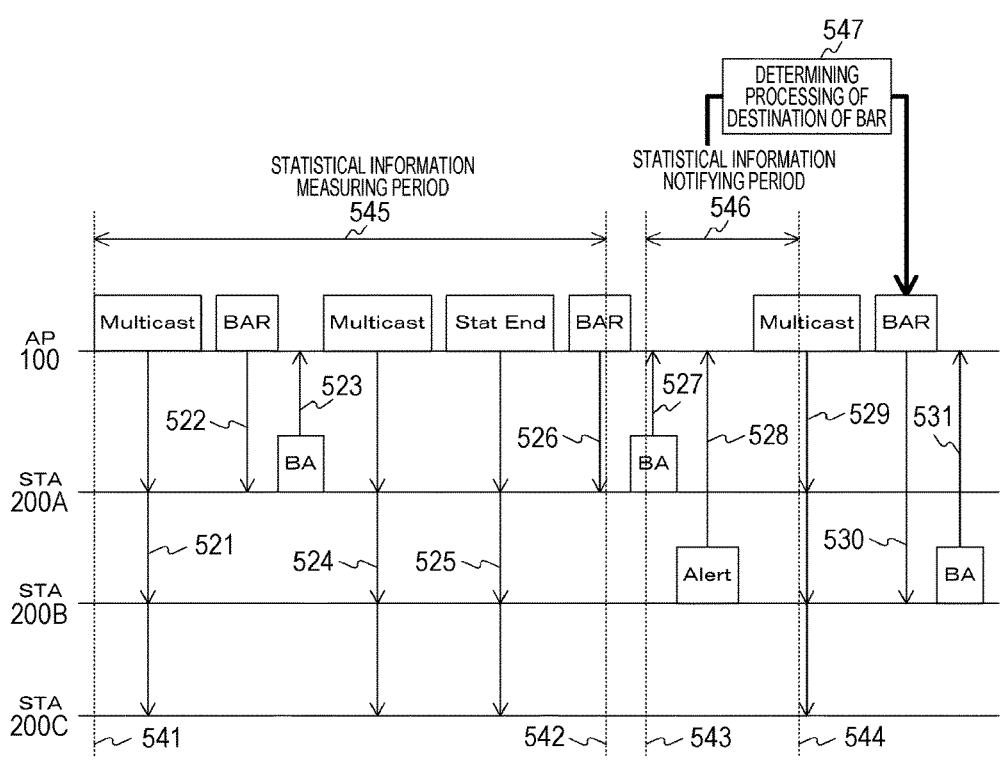
FIG. 12 is a diagram schematically illustrating data exchanged among devices according to the first embodiment of the present technology and a statistical information measuring period and a statistical information notifying period set to the STAs 200A to 200C.

For example, the control unit 130 performs control to notify an STA 200 of a period (for example, a statistical information measuring period 545 illustrated in FIG. 12) for the STA 200 to acquire information regarding a communication state in the STA 200 (information regarding a reception characteristic (statistical information)). Furthermore, for example, the control unit 130 performs control to cause the STA 200 to notify information regarding the communication state acquired in the period and to determine a destination of a delivery confirmation request (for example, BAR) on the basis of the information regarding the communication state.

For example, the control unit 130 performs control to cause an STA 200, in which the information regarding the communication state acquired in the period satisfies a predetermined condition, to transmit the information regarding the communication state. For example, the control unit 130 causes an STA 200 to determine whether a reception characteristic in the STA 200 satisfies the predetermined condition on the basis of the information regarding the communication state acquired in the period. Then, the control unit 130 can cause the STA 200 to transmit the information regarding the communication state only in the case where the reception characteristic satisfies the predetermined condition. Here, the case where the information regarding the communication state satisfies the predetermined condition is, for example, a case where the reception characteristic specified by the information regarding the communication state is less than a threshold value.

Figure 8:
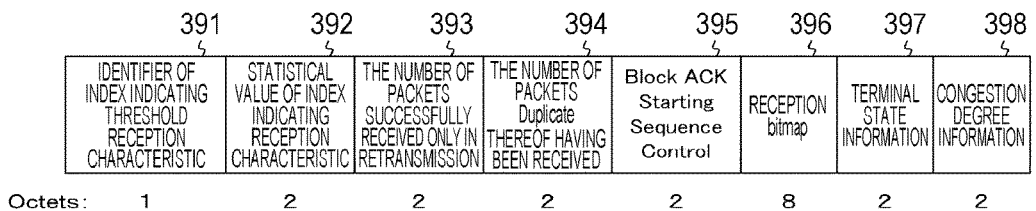
FIG. 8 is a diagram illustrating an exemplary configuration of information to be notified to the AP 100 according to the first embodiment of the present technology.

Furthermore, for example, the control unit 130 performs control to notify information regarding the reception characteristic in the STA 200 (for example, each of the pieces of information illustrated in FIG. 8) as the information regarding the communication state. The information regarding the reception characteristic may be, for example, at least one of a throughput, a packet loss rate, the number of multicast packets successfully received by the information processing device and addressed to the multicast group to which the information processing device belongs, and the ratio of the sum of noise power and interference power relative to a desired signal power.

Figure 6:
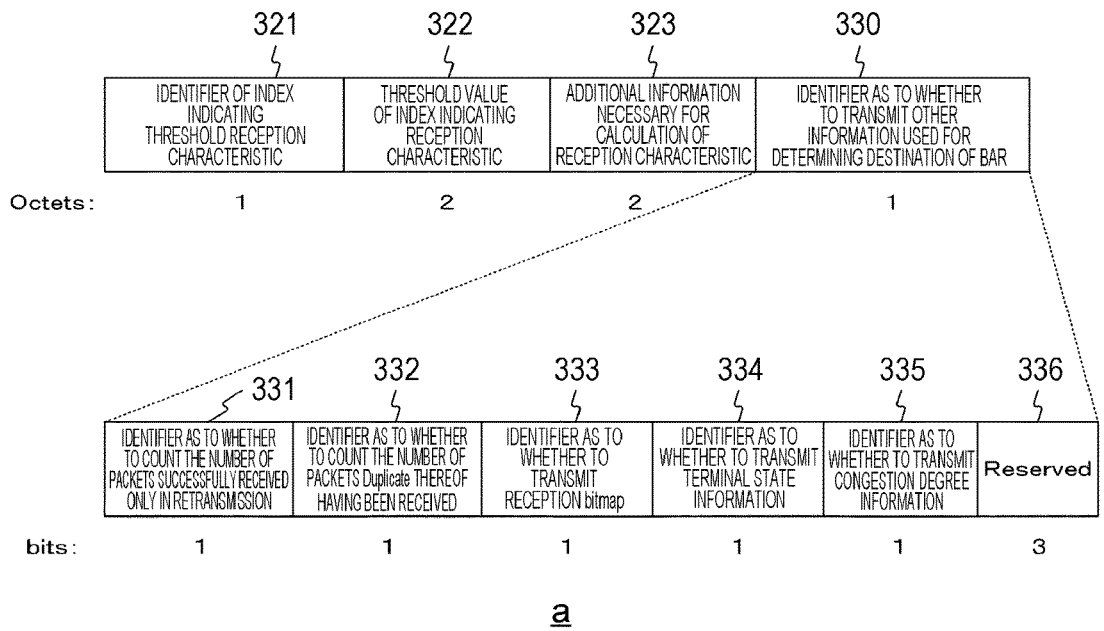
FIG. 6 is a diagram illustrating an exemplary configuration of information transmitted by the AP 100 (information requested for notification from the STA 200) according to the first embodiment of the present technology.

Furthermore, for example, the control unit 130 performs control to notify the STA 200 of information for specifying the information regarding the communication state in the STA 200 (identifier of an index indicating a reception characteristic in the STA 200 (for example, each of the pieces of information illustrated in a of FIG. 6)).

[Exemplary Configuration of STA]

Figure 3:
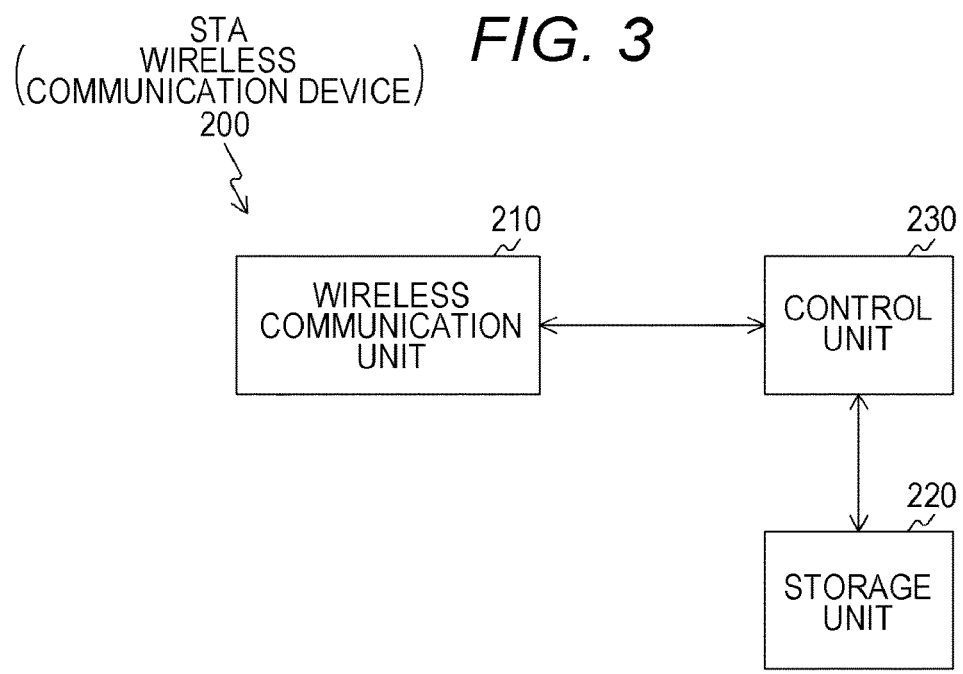
FIG. 3 is a block diagram illustrating an example of a logical configuration of an STA 200 according to the first embodiment of the present technology.

FIG. 3 is a block diagram illustrating an example of a logical configuration of an STA 200 according to the first embodiment of the present technology. As illustrated in FIG. 3, the STA 200 includes a wireless communication unit 210, a storage unit 220, and a control unit 230.

The wireless communication unit 210 is a wireless communication interface that mediates wireless communication with other devices by the STA 200. In an embodiment of the present technology, the wireless communication unit 210 performs wireless communication with the AP 100. For example, the wireless communication unit 210 receives a radio signal transmitted from the AP 100. The wireless communication unit 210 may have functions as an amplifier, a frequency converter, a demodulator, and other devices. For example, the wireless communication unit 210 may output received data to the control unit 230. Furthermore, the wireless communication unit 210 transmits a radio signal to the AP 100 via an antenna. The wireless communication unit 210 may have functions as a modulator, an amplifier, and other devices. For example, the wireless communication unit 210 may transmit data output from the control unit 230 after performing modulation, power amplification, and other processing.

Furthermore, the wireless communication unit 210 receives a frame multicast from the AP 100. Furthermore, the wireless communication unit 210 receives a BAR from the AP 100 and transmits a BA to the AP 100. Moreover, the wireless communication unit 210 transmits and receives various messages for flexibly changing a destination of the BAR to and from the AP 100.

The storage unit 220 is a part for recording and reproducing data on a predetermined recording medium. For example, the storage unit 220 stores information included in each message or the like notified by the AP 100.

The control unit 230 functions as an arithmetic processing device and a control device and controls the overall operation in the STA 200 according to various programs.

For example, the control unit 230 performs control to transmit to the AP 100 information (statistical information) regarding the STA 200 acquired in the period (statistical information measuring period) notified from the AP 100. In this case, in a case where the acquired information regarding the communication state satisfies the predetermined condition, the control unit 230 can transmit the information regarding the communication state satisfying the predetermined condition to the AP 100. Here, examples of the case where the information regarding the communication state satisfies the predetermined condition include a case where the reception characteristic of the STA 20 is less than a threshold value. Moreover, the information used for determining whether the predetermined condition is satisfied (information regarding the communication state) and the information transmitted to the AP 100 (information regarding the communication state) may be the same (or at least a part thereof is the same) or different. For example, in the case where these pieces of information are different, the information used for determining whether the predetermined condition is satisfied (information regarding the communication state) and the information transmitted to the AP 100 (information regarding the communication state) may be related to each other. For example, the information used for determining whether the predetermined condition is satisfied (information regarding the communication state) may be used as a threshold value (for example, packet error rate (PER)), and the information transmitted to the AP 100 (information regarding the communication state) may be a BA bitmap. Alternatively, for example, in the case where these pieces of information are different, the information used for determining whether the predetermined condition is satisfied (information regarding the communication state) and the information transmitted to the AP 100 (information regarding the communication state) may be unrelated to each other. Moreover, for example as for the information used for determining whether the predetermined condition is satisfied (information regarding the communication state) and the information transmitted to the AP 100 (information regarding the communication state), information acquired concurrently by the STA 200 may be used, or alternatively, information separately acquired at different timings may be used.

Furthermore, for example the control unit 230 can transmit information regarding a reception characteristic in the STA 200 as the information regarding the communication state. Examples of the information regarding the reception characteristic include a value corresponding to an index indicating a reception characteristic in the STA 200 or a value corresponding to an identifier of the index.

[Exemplary Configuration of Measuring Period Information]

FIG. 4 is a diagram illustrating an exemplary configuration of information regarding a statistical information measuring period transmitted by the AP 100 according to the first embodiment of the present technology.

The information regarding the statistical information measuring period is necessary for each of the slave devices to measure statistical information equally among the slave devices. Note that the statistical information is an example of information regarding a communication state described in the claims.

The information regarding the statistical information measuring period includes, for example, a statistical start time 301, a statistical period 302, an interval 303 to restart of statistics, and the number of times of statistical measurement 304. Note that in FIG. 4, a numerical value representing the number of octets of each field is illustrated below each field. Also in each of the subsequent figures, similarly, a numerical value representing the number of octets of each field (or a part thereof) is illustrated below or above each field.

The statistical start time 301 is information for specifying a timing to start measurement of statistical information. For example, the statistical start time 301 may be absolute time. Furthermore, for example, the statistical start time 301 may be set to be a relative time from time when the last frame transmitted from the AP 100 has been successfully received. Here, a frame finally transmitted from the AP 100 may be limited to a specific frame (for example, beacon or multicast frame).

Note that, instead of the statistical start time, a sequence number at which a statistical period starts may be used.

The statistical period 302 is information for specifying a period for measuring statistical information. For example, instead of the statistical period 302, a period for measuring statistical information may be specified using statistical measurement ending time.

The interval 303 to restart of statistics is information for specifying an interval between periods for measuring statistical information. For example, the interval 303 to the restart of statistics can be used in a case where a Stat End frame is transmitted to the STA 200 only once and the STA 200 is caused to execute measurement of statistics repeatedly. By using the information of the interval 303 to the restart of statistics to transmit the Stat End frame to the STA 200 only once in the above manner, an overhead of the Stat End frame can be reduced.

The number of times of statistical measurement 304 is information for specifying the number of times in a case where the STA 200 is caused to execute measurement of statistics repeatedly. For example, it is possible to cause the STA 200 to execute measurement of statistics repeatedly at the intervals specified by the interval 303 until the restart of statistics for the number of times specified by the number of times of statistical measurement 304.

Here, the statistical period may be set to a fixed value or may be determined on the basis of the communication environment, traffic to be communicated, and the like. For example, the AP 100 can change the length of a statistical period on the basis of a traffic characteristic. Here, the traffic characteristic is information regarding, for example, the number of packets transferred from an upper layer, a data transmission rate (for example, data transmission speed (bps (bits per second) related to packet output)), and the like.

For example, the AP 100 can extend a statistical period in a case where the number of packets transferred from the upper layer is larger than or equal to a threshold value (or in a case where the data transmission rate is larger than or equal to a threshold value). Alternatively, for example, the AP 100 can shorten a statistical period in a case where the number of packets transferred from the upper layer is less than a threshold value (or in a case where the data transmission rate is less than a threshold value).

Note that these pieces of information are examples, and other information for specifying the statistical information measuring period may be used as the information regarding the statistical information measuring period.

[Exemplary Configuration of Statistical Information Notifying Period]

FIG. 5 is a diagram illustrating an exemplary configuration of information regarding a statistical information notifying period transmitted by the AP 100 according to the first embodiment of the present technology.

Figure 9:
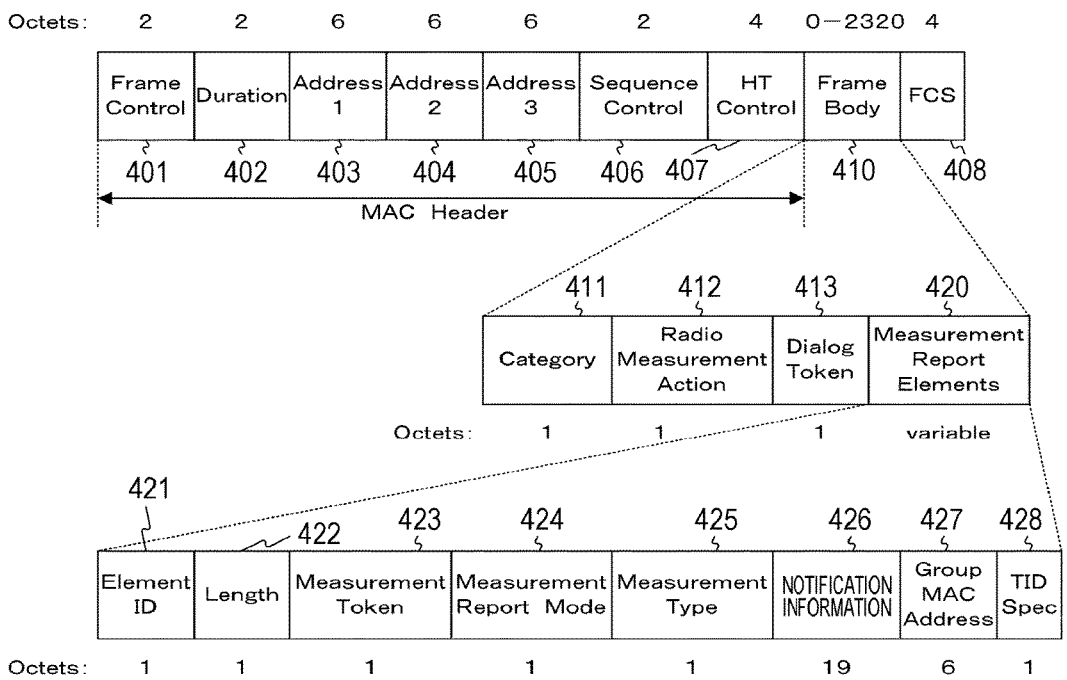
FIG. 9 is a diagram illustrating an exemplary configuration of an Alert frame transmitted by the STA 200 to the AP 100 according to the first embodiment of the present technology.
Figure 10:
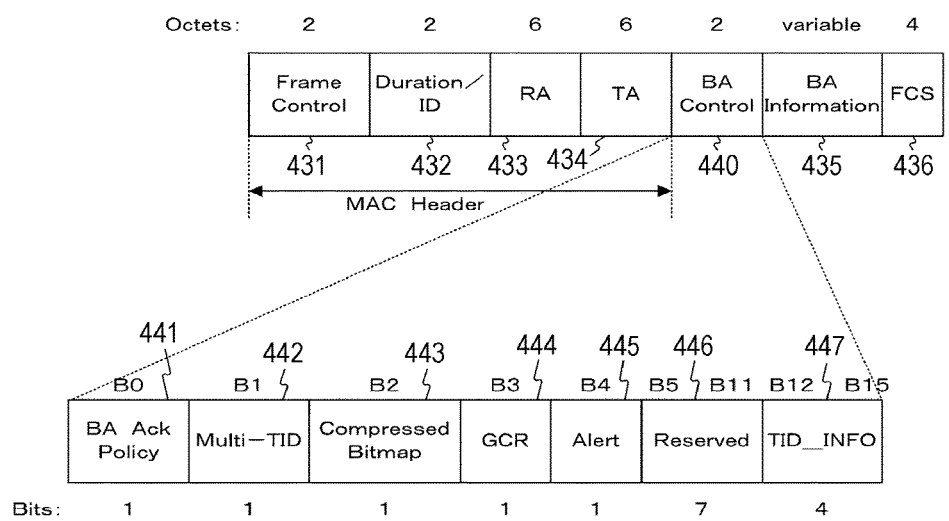
FIG. 10 is a diagram illustrating an exemplary configuration of an Alert frame transmitted by the STA 200 to the AP 100 according to the first embodiment of the present technology.

The information regarding a statistical information notifying period is for specifying a period during which an STA 200 satisfying a criteria can transmit an Alert frame (illustrated in FIGS. 9 and 10).

The information regarding a statistical information notifying period includes, for example, a statistical information notification start time 311 and a statistical information notifying period 312.

The statistical information notification start time 311 is information for specifying a start timing of the period during which the STA 200 satisfying the criteria can transmit the Alert frame. For example, the statistical information notification start time 311 may be absolute time. Moreover, for example, the statistical information notification start time 311 may be set as relative time after receiving a Stat End frame.

The statistical information notifying period 312 is information for specifying a period during which the STA 200 satisfying the criteria can transmit the Alert frame.

Here, in the period specified by the statistical information notifying period 312, there is a possibility that a plurality of STAs 200 start transmission processing at the same time, and thus opportunities of collision between frames may increase. Therefore, in order to improve efficiency of utilization of wireless resources, it is desirable that each of the STAs 200 randomly selects a start timing of transmission processing during that period to reduce the opportunity of collision. Note that the transmission processing here referred to means the entire processing relating to frame transmission. For example, transmission standby processing by carrier sense multiple access/collision avoidance (CSMA/CA) and other processing are also included in the transmission processing.

Moreover, instead of the statistical information notifying period, statistical information notification end time may be used.

Here, the statistical information notifying period may be a fixed value, or may be determined on the basis of the communication environment, traffic to be communicated, the number of STAs 200, and the like. For example, the AP 100 can change the length of the statistical information notifying period on the basis of the number of STAs 200 coupled to the AP 100.

For example, the AP 100 can extend the statistical information notifying period in a case where the number of the STAs 200 coupled to the AP 100 is larger than or equal to a threshold value. Furthermore, for example, the AP 100 can shorten the statistical information notifying period in a case where the number of the STAs 200 coupled to the AP 100 is less than the threshold value.

Note that these pieces of information are merely examples, and other information for specifying a statistical information notifying period may be used as the information regarding the statistical information notifying period.

[Exemplary Configuration of Information Requested for Notification]

FIG. 6 is a diagram illustrating an exemplary configuration of information transmitted by the AP 100 (information requested for notification from the STA 200) according to the first embodiment of the present technology.

The information requested for notification (information regarding a statistical value requested for notification) is used for providing a criterion (threshold value) for determining whether the STA 200 transmits an Alert frame (illustrated in FIGS. 9 and 10). Furthermore, the information requested for notification is for notifying what type of information the STA 200 is to include in the Alert frame.

The information requested for notification includes, for example, an identifier 321 of an index indicating a threshold value reception characteristic, a threshold value 322 of an index indicating a reception characteristic, additional information 323 necessary for calculation of a reception characteristic, and an identifier 330 as to whether to select other information used for determining a destination of a BAR.

The identifier 321 of an index indicating a threshold value reception characteristic is an identifier for specifying an index (index indicating the reception characteristic) used for determining whether the STA 200 transmits an Alert frame.

Here, the index indicating a reception characteristic is, for example, at least one of a throughput, a packet loss rate, the number of multicast packets successfully received and destined for the multicast group to which an STA belongs, a ratio of the sum of noise power and interference power relative to a desired signal power. An example of the relationship between indices indicating these reception characteristics and identifiers is illustrated in b of FIG. 6.

For example, in a case where "0" is stored in the identifier 321 of the index indicating a threshold value reception characteristic, a MAC service data unit (Rx MSDU) is used as the reception characteristic. This Rx MSDU is, for example, the number of multicast packets or information regarding the number of packets successfully received (information regarding a throughput).

Furthermore, for example, in a case where "1" is stored in the identifier 321 of the index indicating a threshold value reception characteristic, a packet error rate (PER) is used as the reception characteristic.

Furthermore, for example, in a case where "2" is stored in the identifier 321 of the index indicating the threshold value reception characteristic, a throughput is used as the reception characteristic.

Furthermore, for example, in a case where "3" is stored in the identifier 321 of the index indicating a threshold value reception characteristic, a signal-to-interference noise ratio (SINR) is used as the reception characteristic.

The threshold value 322 of the index indicating a reception characteristic is a threshold value for determining whether an STA 200 transmits an Alert frame (illustrated in FIGS. 9 and 10) to the AP 100. Using this threshold value, the STA 200 can determine whether to transmit an Alert frame to the AP 100. As a result, the AP 100 can control to cause only an STA 200 having a poor reception characteristic to transmit an Alert frame.

For example, a case is assumed where the index indicating a reception characteristic is one of a throughput, a packet loss rate, the number of multicast packets successfully received and destined for the multicast group to which the STA 200 belongs. In this case, it is desirable to set the threshold value in conjunction with the statistical period.

Here, an example will be described in which the index indicating a reception characteristic is the number of multicast packets successfully received and destined for the multicast group to which the device to which the STA 200 belongs.

For example, in a case of causing the STA 200 to transmit statistical information regarding a reception characteristic for one second in the past before transmission of the Stat End frame, the number of packets transmitted by the AP 100 during the one second is the maximum number of packets receivable by the STA 200. Therefore, the AP 100 determines how many packets an STA has to fail to receive out of the maximum number of packets for the STA to be determined as having a poor characteristic. That is, with respect to the maximum number of packets, it is determined what level of value is set as a threshold value.

In this manner, the AP 100 can adaptively set the threshold value on the basis of the statistical period and the number of packets transmitted during the statistical period. As a result, the AP 100 can control to cause only an STA having a poor reception characteristic to transmit an Alert frame.

Here, in a case where the threshold value is not appropriately set, it is assumed that many STAs transmit Alert frames. Alternatively, it is also assumed that most STAs do not transmit an Alert frame. In such a case, it is difficult for the AP 100 to appropriately collect statistics. Therefore, it is preferable that the AP 100 sets the threshold value on the basis of a previous trial.

Therefore, for example, the AP 100 can update the threshold value on the basis of the number of STAs having transmitted the Alert frame in the previous trial. Alternatively, the AP 100 can update the threshold value on the basis of the ratio of the number of STAs that sent the Alert frame to the total number of STAs belonging to the multicast group in the previous trial. Moreover, the AP 100 can update the threshold value on the basis of both of these values (the number of STAs transmitted an Alert frame and the ratio of the number of STAs transmitted an Alert frame).

Note that in a case where the PER of the value "1" is used as an index out of the indices illustrated in b of FIG. 6, it can be determined that a reception characteristic of an STA is deteriorated when the PER is higher than a threshold value. On the other hand, in a case of using another index out of the indices illustrated in b of FIG. 6, it can be determined that the reception characteristic of the STA is deteriorated when the index is lower than a threshold value.

The additional information 323 necessary for calculation of a reception characteristic is necessary for calculating the reception characteristic. For example, in a case where the index indicating a reception characteristic is a packet error rate, in order for an STA 200 to calculate the packet error rate, the total number of multicast packets transmitted by the AP 100 is necessary. In this manner, depending on an index, additional information may be necessary. Therefore, depending on an index, information necessary for the STA 200 to calculate the reception characteristic can be included in the information requested for notification.

The identifier 330 as to whether to select other information used for determining a destination of a BAR includes, for example, an identifier 331 as to whether to count the number of packets successfully received only in retransmission, an identifier 332 as to whether to count the number of packets a duplicate thereof having been received, an identifier 333 as to whether to transmit a reception bitmap, an identifier 334 as to whether to transmit terminal state information, an identifier 335 as to whether to transmit congestion degree information, and Reserved 336. Note that Reserved 336 represents a reserved area.

The identifier 331 as to whether to count the number of packets successfully received only in retransmission indicates whether to count and notify of the number of multicast packets that has failed to be received in the initial transmission but successfully received in retransmission. For example, "1" is stored in a case where notification is necessary, and "0" is stored in a case where notification is unnecessary.

Here, information regarding the number of packets successfully received only in retransmission can be rephrased as the number of packets that could be saved by retransmission. Therefore, this information can be used as an index of the degree how much the STA 200 receives benefits of retransmission control by the current BAR destination. Therefore, the AP 100 can determine how much the STA 200 receives benefits of retransmission control by the current BAR destination on the basis of the information regarding the number of packets successfully received only in retransmission and determine a destination of the BAR on the basis of the determination result.

The identifier 332 as to whether to count the number of packets a duplicate thereof having been received indicates whether to count and notify of the number of multicast packets having been successfully received in the initial transmission and successfully received also in retransmission. For example, "1" is stored in a case where notification is necessary, and "0" is stored in a case where notification is unnecessary.

Here, the information regarding the number of packets a duplicate thereof having been received can be rephrased as the number of redundant packets successfully received by the STA 200. For example, in a case where the STA 200 can receive a large number of redundant packets despite a poor reception characteristic, it can be grasped that retransmission control by the current BAR destination does not function well. Therefore, the AP 100 can determine whether retransmission control by the current BAR destination functions well on the basis of the information regarding the number of packets a duplicate thereof having been received and appropriately determine a destination of the BAR on the basis of the determination result.

The identifier 333 as to whether to transmit a reception bitmap indicates whether to transmit a reception bitmap (BA bitmap) of multicast packets to the AP 100. For example, "1" is stored in a case where notification is necessary, and "0" is stored in a case where notification is unnecessary.

For example, by receiving the reception bitmap of multicast packets from an STA 200, the AP 100 can grasp a reception characteristic of the STA 200 in more detail. As a result, the AP 100 can more appropriately determine a destination of the BAR.

The identifier 334 as to whether to transmit terminal state information indicates whether to transmit terminal state information to the AP 100. This terminal state information relates to, for example, the state in an STA 200. For example, at least one of information regarding transfer of the STA 200 (transfer degree information), information regarding a position where the STA 200 exists (position information), and information regarding the battery of the STA 200 (battery information) can be used as the terminal state information. For example, "1" is stored in a case where notification is necessary, and "0" is stored in a case where notification is unnecessary. Note that an identifier indicating the type of the terminal state information may be stored.

By referring to the terminal state information, for example, the AP 100 can detect whether degradation of a reception characteristic in the STA 200 is temporary or whether the STA 200 is about to leave a coverage area of the AP 100. Therefore, in a case where the AP 100 acquires the terminal state information from the STA 200, the terminal state information can be used as information for appropriately determining a destination of a BAR.

For example, the AP 100 can determine a destination of a BAR on the basis of the transfer degree information and the position information of the STA 200. For example, in a case where the AP 100 detects that the STA 200 is about to leave the coverage area of the AP 100 on the basis of the transfer degree information and the position information of the STA 200, the AP 100 can determine not to select the STA 200 as a destination of a BAR.

Furthermore, for example, the AP 100 can determine a destination of a BAR on the basis of the battery information of the STA 200. For example, in a case where a remaining amount of battery of the STA 200 is less than a reference of a threshold value (for example, in a case where it is determined that a remaining amount of battery is less than the threshold value held by the AP 100), the AP 100 can determine not to select the STA 200 as a destination of a BAR.

The identifier 335 as to whether to transmit congestion degree information indicates whether to transmit congestion degree information to the AP 100. The congestion degree information is for specifying the congestion degree related to wireless communication in the STA 200. For example, "1" is stored in a case where notification is necessary, and "0" is stored in a case where notification is unnecessary. For example, the congestion degree related to wireless communication in the STA 200 can be defined as, for example, a ratio of wireless resources actually allocated to the STA 200 to all the wireless resources included in the STA 200.

Here, depending on a wireless congestion situation in the STA 200, it is assumed that how much overhead due to a delivery confirmation request is acceptable varies. Therefore, for example, in a case where the congestion degree information is acquired from the STA 200, the AP 100 can determine (change) the number of destinations of a BAR on the basis of the congestion degree specified by the congestion degree information.

Figure 13:
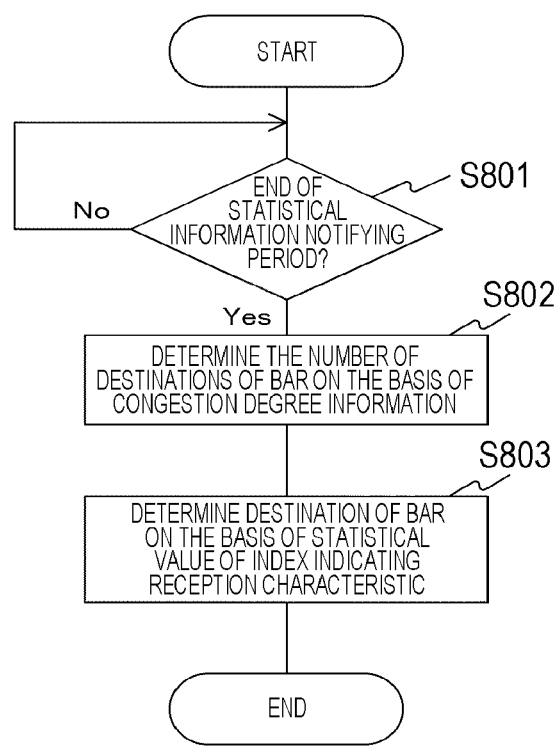
FIG. 13 is a flowchart illustrating an example of a processing procedure of a BAR destination determination processing by the AP 100 according to the first embodiment of the present technology.

In this manner, the AP 100 can use the congestion degree information acquired from the STA 200 for appropriately determining the number of destinations of the BAR. This use example is illustrated in FIG. 13.

[Exemplary Configuration of Stat End Frame]

Figure 7:
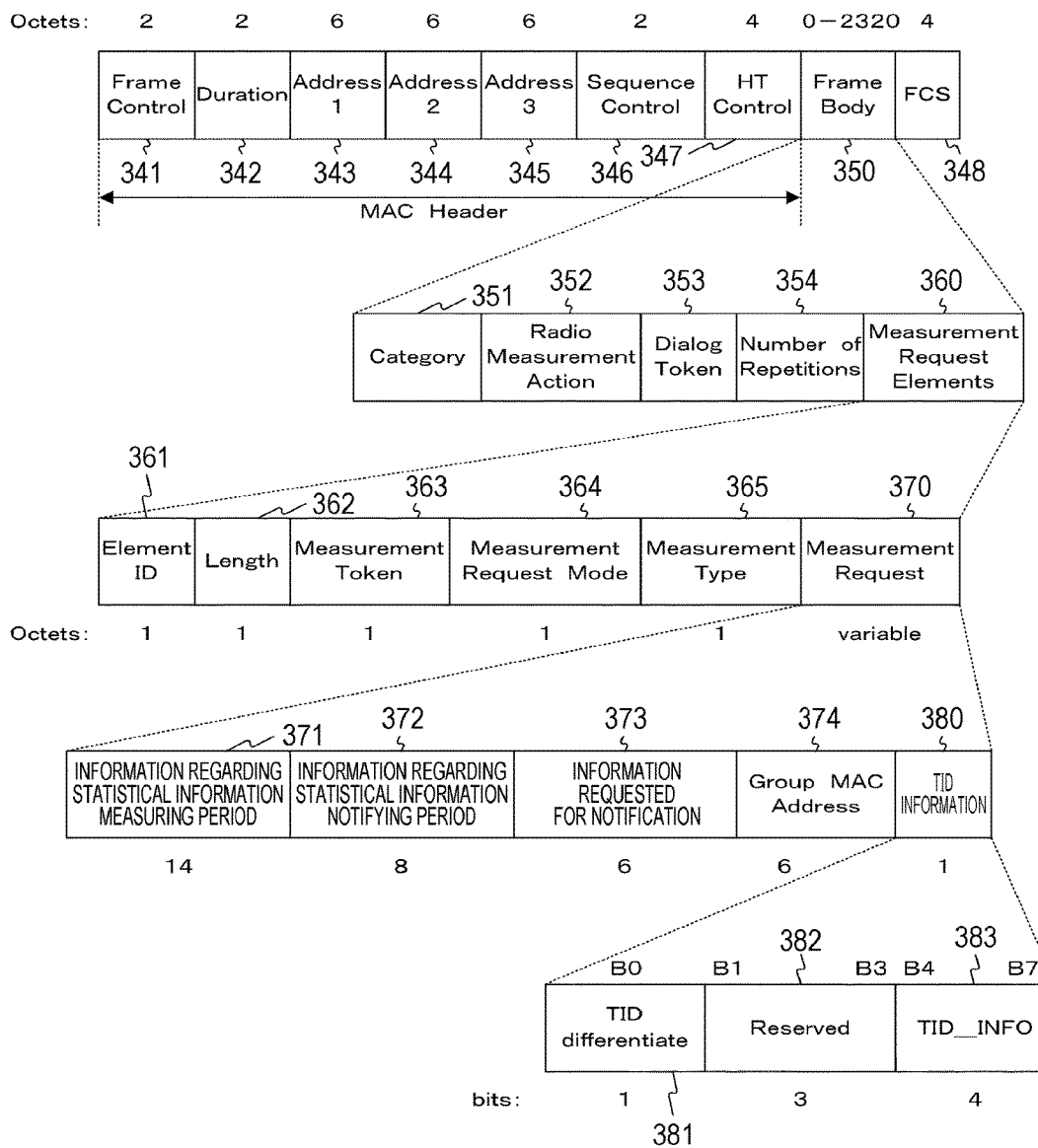
FIG. 7 is a diagram illustrating an exemplary configuration of a Stat End frame transmitted by the AP 100 according to the first embodiment of the present technology.

FIG. 7 is a diagram illustrating an exemplary configuration of a Stat End frame transmitted by the AP 100 according to the first embodiment of the present technology.

In FIG. 7, an example is illustrated in which a Stat End frame is formed by including each piece of information in a frame body 350 (fields 351 to 354, and 360) of a Management frame (fields 341 to 348, and 350). More specifically, an example is illustrated in which components of the Stat End frame (pieces of information illustrated in FIGS. 4 to 6) are stored as information elements in the frame body 350.

More specifically, the components of the Stat End frame (each of the pieces of information illustrated in FIGS. 4 to 6) are stored in a Measurement Request 370 out of respective fields 361 to 365 and 370 forming Measurement Request Elements 360.

For example, the information regarding the statistical information measuring period illustrated in FIG. 4 can be stored in a field 371, the information regarding the statistical information notifying period illustrated in FIG. 5 can be stored in a field 372, and the information requested for notification illustrated in FIG. 6 can be stored in a field 373.

Furthermore, in a Group MAC Address 374, a multicast address is stored.

Furthermore, three fields 381 to 383 are arranged in traffic ID (TID) information 380. Note that Reserved 382 represents a reserved area.

In TID differentiate 381, an identifier as to whether to distinguish TID information is stored.

In TID_INFO 383, information for designating which TID is used in a case where TID information is distinguished is stored.

Here, for example, data having the same multicast address but different TIDs is also assumed. For example, it is also assumed that video data and audio data are transmitted using the same multicast address. In this case, by using a TID, it is possible to identify video data and audio data having the same multicast address.

In this manner, the TID differentiate 381 and the TID_INFO 383 enable appropriately identifying each piece of data having the same multicast address but different traffic, for example.

Note that the Management frame storing the components of the Stat End frame (each of the pieces of information illustrated in FIGS. 4 to 6) can be included in a Beacon frame and transmitted to the STA 200, for example.

Note that the configuration of the Stat End frame illustrated in FIG. 7 is an example, and the present invention is not limited thereto.

For example, the AP 100 can be set a Stat End frame by storing the components (each of the pieces of information illustrated in FIGS. 4 to 6) of the Stat End frame in a frame body of a Control frame.

Furthermore, for example, the AP 100 can set a Stat End frame by storing the components (each of the pieces of information illustrated in FIGS. 4 to 6) of the Stat End frame in a frame body of a data frame.

Furthermore, for example, the AP 100 can set a Stat End frame by storing the components (each of the pieces of information illustrated in FIGS. 4 to 6) of the Stat End frame in a part of a data frame.

Furthermore, for example, the AP 100 can set a Stat End frame by storing the components (each of the pieces of information illustrated in FIGS. 4 to 6) of the Stat End frame in one of sub-frames of an aggregation frame destined to an STA 200. Note that the aggregation frame is a concatenated frame in which a plurality of frames are concatenated.

Furthermore, for example, the AP 100 can set a Stat End frame by storing the components (each of the pieces of information illustrated in FIGS. 4 to 6) of the Stat End frame in a part of a MAC header.

In this manner, the control unit 130 can perform control to notify the STA 200 of the period information for specifying a start and an end of the statistical information measuring period. In this case, the control unit 130 can notify the STA 200, as the period information, of at least one of start time of the period and a sequence number for starting the period and at least one of the period and end time of the period.

Furthermore, the control unit 130 can perform control to notify the STA 200 of the notification period information for specifying the notification period (statistical information notifying period) during which the STA 200 can notify the AP 100 of the statistical information (information regarding the communication state). In this case, the control unit 130 can notify the STA 200, as the notification period information, of the start time of the notification period and at least one of the notification period and the end time of the notification period.

[Exemplary Configuration of Information to be Notified to AP]

FIG. 8 is a diagram illustrating an exemplary configuration of information to be notified to the AP 100 according to the first embodiment of the present technology. The information illustrated in FIG. 8 is information transmitted from an STA 200 to the AP 100 (information regarding a statistical value to be notified) in accordance with the information illustrated in FIG. 6 (information requested for notification from the AP 100 to the STA 200). Furthermore, the information illustrated in FIG. 8 is transmitted to the AP 100 in a case where a criteria (threshold value) specified on the basis of the information (information illustrated in FIG. 6) from the AP 100. Moreover, the information illustrated in FIG. 8 is used when the AP 100 determines a destination of the BAR.

The information to be notified to the AP 100 includes, for example, an identifier 391 of an index indicating a threshold value reception characteristic, a statistical value 392 of an index indicating a reception characteristic, the number of packets successfully received only in retransmission 393, the number of packets a duplicate thereof having been received 394, Block Ack Starting Sequence Control 395, a reception bitmap 396, terminal state information 397, and congestion degree information 398.

The identifier 391 of an index indicating a threshold value reception characteristic corresponds to the identifier 321 of an index indicating a threshold value reception characteristic illustrated in a of FIG. 6.

The statistical value 392 of an index indicating a reception characteristic is a statistical value of an index specified by the identifier 391 of an index indicating a threshold value reception characteristic. This statistical value is acquired by the STA 200 in the period notified by the AP 100 (value of the index notified by the AP 100).

The number of packets successfully received only in retransmission 393 is a statistical value of multicast packets that has failed to be received in the initial transmission but successfully received in retransmission. Note that the number of packets successfully received only in retransmission 393 is arranged in a case where the identifier 331 as to whether to count the number of packets successfully received only in retransmission illustrated in a of FIG. 6 is "1".

The number of packets a duplicate thereof having been received 394 is a statistical value of the multicast packets having been successfully received in the initial transmission and successfully received also in retransmission. Note that the number of packets a duplicate thereof having been received 394 is arranged in a case where the identifier 332 as to whether to count the number of packets a duplicate thereof having been received illustrated in a of FIG. 6 is "1".

The Block Ack Starting Sequence Control 395 is information necessary for identifying from which sequence number the reception bitmap starts.

The reception bitmap 396 is a reception bitmap of multicast packets. Note that the reception bitmap 396 is arranged in a case where the identifier 333 as to whether to transmit a reception bitmap illustrated in a of FIG. 6 is "1".

The terminal state information 397 is information regarding the state (terminal state information) in the STA 200. Note that the terminal state information 397 is arranged in a case where the identifier 334 as to whether to transmit terminal state information illustrated in a of FIG. 6 is "1".

The congestion degree information 398 is information (congestion degree information) regarding a congestion degree related to wireless communication in the STA 200. Note that the congestion degree information 398 is arranged in a case where the identifier 335 as to whether to transmit congestion degree information illustrated in a of FIG. 6 is "1".

Note that each of the pieces of information illustrated in FIG. 8 (statistical value and statistical information) may be, for example, at least one of a raw value, a quantized value, an instantaneous value, an average value, a value uniquely derived from these values, indexes in a list of a quantized values.

[Exemplary Configuration of Alert Frame]

FIGS. 9 and 10 are diagrams illustrating an exemplary configuration of an Alert frame transmitted by an STA 200 to the AP 100 according to the first embodiment of the present technology. Note that a configuration of the Alert frame can vary. Therefore, in FIG. 9, an example is illustrated in which an Alert frame is formed by storing each of the pieces of information illustrated in FIG. 8 in a frame body 410 of a Management frame (fields 401 to 408 and 410).

For example, components of the Alert frame (pieces of information illustrated in FIG. 8) can be stored in the frame body as information elements.

In FIG. 9, an example of storing components (each of the pieces of information illustrated in FIG. 8) of the Alert frame in a field 420 out of Radio Measurement Report frame Action fields (fields 411 to 413 and 420) corresponding to the frame body 410.

Specifically, it is possible to store the components of the Alert frame (each of the pieces of information illustrated in FIG. 8) in one or more fields (notification information 426) of Measurement Report Elements 420 (fields 421 to 428).

Moreover, the group MAC address 427 is a multicast address and corresponds to the group MAC address 374 illustrated in FIG. 7.

Furthermore, TID Spec 428 is information for specifying whether to distinguish TID information. That is, the group MAC address 427 and the TID Spec 428 are information used for identifying the notification information 426 (information to be notified to the AP 100).

Note that the configuration of the Alert frame illustrated in FIG. 9 is an example and other configurations may be employed.

For example, an Alert frame can be formed by storing each of the pieces of information illustrated in FIG. 8 in a frame body of a Control frame.

Furthermore, for example, an Alert frame can be formed by storing each of the pieces of information illustrated in FIG. 8 in a frame body of a data frame.

Furthermore, for example, an Alert frame can be formed by storing each of the pieces of information illustrated in FIG. 8 in one of sub-frames of an aggregation frame destined to the AP 100.

Furthermore, for example, an Alert frame can be formed by storing each of the pieces of information illustrated in FIG. 8 in a part of an MAC header.

Furthermore, for example, an Alert frame can be formed by using a Block Ack frame and notifying at least one of the respective piece of information illustrated in FIG. 8. This example is illustrated in FIG. 10.

It is possible to notify at least one of the pieces of information illustrated in FIG. 8 by using the Reserved area of BA Control 440 in the Block Ack frame (fields 431 to 436 and 440) illustrated in FIG. 10.

For example, one bit out of the Reserved areas 445 and 446 of the BA Control fields 441 to 447 is set to Alert 445. Then, by setting the Alert 445 to "1", the STA 200 can notify the AP that this Block Ack frame is an Alert frame.

In this manner, in a case where the Alert frame is formed using the Block Ack frame, the STA 200 notifies the AP 100 of only 0 or 1 indicating whether the frame is an Alert frame.

In this case, the AP 100 cannot acquire all the pieces of information illustrated in FIG. 8. Therefore, in a case of determining a destination of a BAR, the AP 100 cannot determine a destination of a BAR on the basis of the information regarding the communication state of the STA 200. Therefore, for example, in a case where the number of STAs 200 transmitted an Alert frame exceeds a threshold value (the number of destinations of a BAR), the AP 100 can determine a destination of a BAR according to a predetermined condition (for example, random). Moreover, the AP 100 can calculate a reception characteristic of each of the STAs on the basis of the information of the BA bitmap and determine a destination of a BAR by using the calculation result.

In this manner, in a case where a Block Ack frame is used, not all of the pieces of information illustrated in FIG. 8 cannot be notified. However, by using the Block Ack frame, the STA 200 can transmit a reception characteristic of the STA 200 by a BA bitmap. Therefore, it is possible to suppress an impact of modification on the current specification.

[Exemplary Communication]

Next, an exemplary communication of data exchanged among a plurality of devices will be described with reference to FIGS. 11 and 12.

Figure 11:
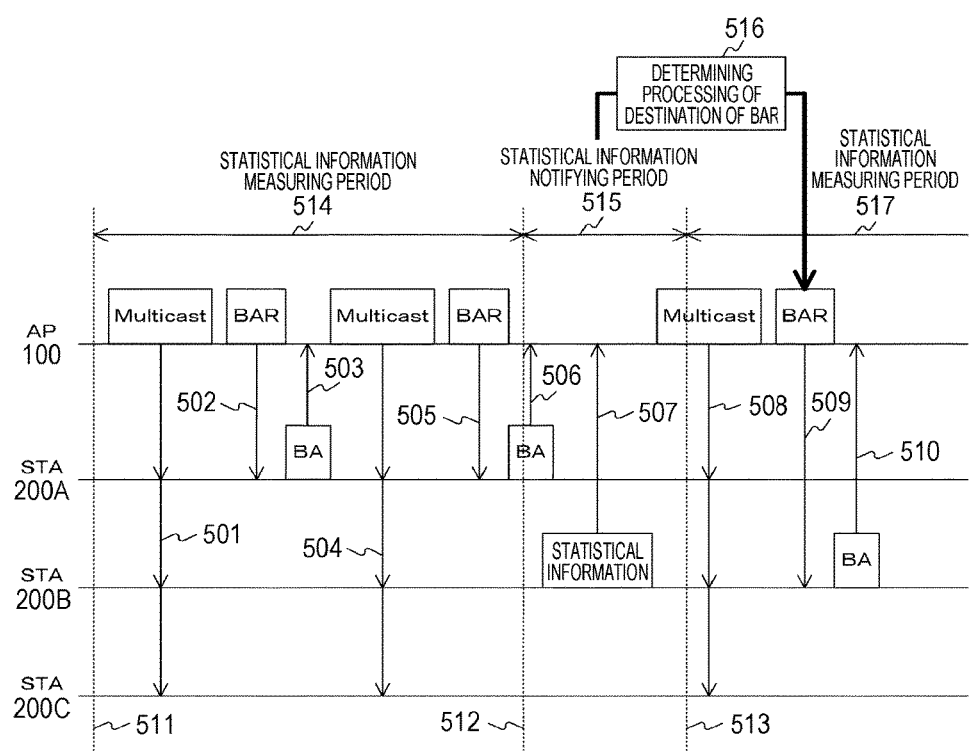
FIG. 11 is a diagram schematically illustrating data exchanged among devices according to the first embodiment of the present technology and statistical information measuring periods and a statistical information notifying period set to STAs 200A to 200C.

In FIGS. 11 and 12, an example in which the AP 100 is set as a source of data transmission and the STAs 200A to 200C are set as destinations of the data transmission. A horizontal axis illustrated in FIG. 11 and FIG. 12 represents a time axis. Moreover, data transmitted from each of the devices is indicated by a rectangle with a name of the data presented inside above a time axis corresponding to each of the devices. Furthermore, in FIGS. 11 and 12, a case where data is transmitted to a plurality of STAs 200 at same time means that data is multicast to a plurality of STAs 200.

[Exemplary Setting of Statistical Information Measuring Period and Statistical Information Notifying Period]

FIG. 11 is a diagram schematically illustrating data exchanged among devices according to the first embodiment of the present technology and statistical information measuring periods and a statistical information notifying period set to the STAs 200A to 200C.

First, the AP 100 performs multicasting to the STAs 200A to 200C (501). Subsequently, the AP 100 transmits a BAR to at least one of the STAs 200 (determined STA 200) (502). In FIG. 11, an example in which determination to transmit a BAR to first the STA 200A is made is illustrated.

In a case where multicast reception from the AP 100 is successful, the STA 200A having received the BAR transmits a BA to the AP 100 (503). Furthermore, thereafter, multicasting (504), BAR transmission (505), and BA transmission (506) are also performed similarly.

Furthermore, the AP 100 notifies the STAs 200A to 200C of statistical information measuring periods 514 and 517. It is further assumed that the AP 100 notifies the STAs 200A to 200C of the statistical information notifying period 515. Note that a notification example of the statistical information measuring period and the statistical information notifying period will be described in detail with reference to FIGS. 12, 15, and 16.

Moreover, in FIG. 11, a start point of the statistical information measuring period 514 is indicated by a dotted line 511, and an end point is indicated by a dotted line 512. Furthermore, in FIG. 11, a start point of the statistical information measuring period 517 is indicated by a dotted line 513.

Moreover, in FIG. 11, a start point of the statistical information notifying period 515 is indicated by the dotted line 512, and an endpoint is indicated by a dotted line 513. Note that in FIG. 11, an example is illustrated in which the start point (dotted line 512) of the statistical information notifying period 515 and the end point (dotted line 512) of the statistical information measuring period 514 are the same.

Here, the STAs 200A to 200C acquire statistical information designated by the AP 100 in the statistical information measuring period 514. Then, in the statistical information notifying period 515, the STAs 200A to 200C transmit the acquired statistical information (notification information) to the AP 100. In this case, only the STA 200 statistical information of which satisfies a predetermined condition transmits the statistical information. In FIG. 11, an example is illustrated in which statistical information of the STA 200B satisfies the predetermined condition and only the STA 200B transmits statistical information 507.

Furthermore, thereafter, the STAs 200A to 200C similarly acquire the statistical information designated by the AP 100 in the statistical information measuring period 517 as necessary.

Here, the AP 100 determines a destination of a BAR on the basis of statistical information (respective pieces of information illustrated in FIG. 8) received in the statistical information notifying period 515 (516). Furthermore, the AP 100 may determine a subsequent statistical information measuring period and the statistical information notifying period on the basis of the statistical information received in the statistical information notifying period 515.

In this manner, in the embodiment of the present technology, an STA 200 receiving multicasting measures statistical information such as a reception characteristic thereof. Then, only the limited STAs 200 satisfying a criterion notified from the AP 100 notify the AP 100 of the measured statistical information.

Moreover, the AP 100 determines a destination of the BAR on the basis of the statistical information notified from the STA 200.

Here, in order to appropriately determine a destination of the BAR, it is important to use equal statistical information for determination of the destination. For this reason, it is important to align the period for measuring statistical information and a timing for measurement among STAs 200 receiving multicasting (for example, the statistical information measuring periods 514 and 517 illustrated in FIG. 11).

In order to efficiently determine a destination of the BAR, it is also important to set a period for each of the STAs 200 to notify the statistical information (for example, the statistical information notifying period 515 illustrated in FIG. 11).

Moreover, the determination method of determining a destination of the BAR on the basis of the statistical information from the STA 200 can be repeated as long as multicast traffic continues. In this manner, by repeatedly performing the determination method as long as the multicast traffic continues, it is possible to adaptively determine (select) an STA 200 having a low reception characteristic as a destination of the BAR. As a result, it is possible to determine an appropriate destination of the BAR while an overhead indispensable for determining a destination of the BAR is reduced. Furthermore, a throughput of all the STAs 200 receiving multicasting can be enhanced.

Note that a protocol for implementing the determination method of determining a destination of the BAR as described above can be executed asynchronously with the multicast traffic.

In the embodiment of the present technology, an example is illustrated in which at least one of a Stat Initiate frame and a Stat End frame is used as information for specifying a statistical information measuring period and a statistical information notifying period.

As described above, the Stat Initiate frame is for notifying an STA 200 of the start of a statistical period. Furthermore, the Stat End frame is for notifying an STA 200 of the end of a statistical period. These frames are transmitted by the AP 100 (downlink (DL)).

Furthermore, in the embodiment of the present technology, an example is illustrated in which an Alert frame is used as information for notifying statistical information. This Alert frame is for an STA 200 to notify the AP 100 of statistical information of the STA 200 satisfying the notified criteria. Furthermore, the Alert frame is transmitted by the STA 200 (uplink (UL)).

Furthermore, in the first embodiment of the present technology, an example is illustrated in which the AP 100 transmits a Stat End frame to the STAs 200A to 200C. As a result, the AP 100 can notify the STAs 200A to 200C of a statistical information measuring period and the statistical information notifying period.

Furthermore, in a second embodiment of the present technology, an example is illustrated in which an AP 100 transmits a Stat Initiate frame and a Stat End frame to STAs 200A to 200C. As a result, the AP 100 can notify the STAs 200A to 200C of a statistical information measuring period and the statistical information notifying period.

Moreover, in a third embodiment of the present technology, an example is illustrated in which an AP 100 transmits a Stat Initiate frame to STAs 200A to 200C. As a result, the AP 100 can notify the STAs 200A to 200C of a statistical information measuring period and the statistical information notifying period.

[Exemplary Communication Using Stat End Frame]

FIG. 12 is a diagram schematically illustrating data exchanged among the devices according to the first embodiment of the present technology and a statistical information measuring period and a statistical information notifying period set to the STAs 200A to 200C.

In FIG. 12, an example is illustrated in which each of the STAs 200A to 200C determines whether each of the STAs 200A to 200C satisfies a transmission criteria of an Alert frame each time a Stat End frame is received from the AP 100 and transmits an Alert frame to the AP 100 in a case where the criteria is satisfied. Moreover, in FIG. 12, an example is illustrated in which a decision to transmit a BAR first to the STA 200A is made.

Similarly to FIG. 11, the AP 100 and the STAs 200A to 200C perform multicasting (521, 524) and BAR transmission (522, 526). Moreover, the STA 200A having received the BAR transmits a BA (523, 527).

Moreover, the STAs 200A to 200C acquire each of statistical values that may be requested to be transmitted to the AP 100 until reception of a Stat End frame from the AP 100. Then, with respect to each of the statistical values that may be requested to be transmitted to the AP 100, the STAs 200A to 200C manage, at a timing when a statistical value is updated, the statistical value at that time in association with a timestamp.

Furthermore, the AP 100 transmits a Stat End frame at a predetermined timing (525). Furthermore, the STAs 200A to 200C receive the Stat End frame (525). As illustrated in FIG. 7, the Stat End frame includes information regarding the statistical information measuring period, information regarding the statistical information notifying period, and information requested for notification.

The STAs 200A to 200C having received the Stat End frame can grasp of which period statistical information is requested on the basis of the information regarding the statistical information measuring period included in the Stat End frame. Therefore, the STAs 200A to 200C having received the Stat End frame calculate statistical information requested by the AP 100 retroactively in the past in a case of receiving the Stat End frame.

In FIG. 12, a start point of the statistical information measuring period 545 is indicated by a dotted line 541, and an end point is indicated by a dotted line 542. Moreover, in FIG. 12, a start point of the statistical information notifying period 546 is indicated by a dotted line 543, and an end point is indicated by a dotted line 544.

Moreover, each of the STAs 200A to 200C determines whether each of the STAs 200A to 200C is to transmit an Alert frame on the basis of the calculated information (information requested for notification by the AP 100). Then, in a case where it is determined that an Alert frame is transmitted, the STAs 200A to 200C include information to be notified to the AP 100 (statistical information (notification information)) in the Alert frame to transmit the information. In FIG. 12, an example is illustrated in which the STA 200B determines to transmit an Alert frame and transmits an Alert frame to the AP 100 (528).

In a case where the AP 100 receives the Alert frame, the AP 100 determines (changes) a destination of the BAR on the basis of the content of the Alert frame (547). For example, a case is assumed where the AP 100 has determined the STA 200A as the destination of the BAR (522, 526) and that the AP 100 has received an Alert frame from the STA 200B (528). In this case, the AP 100 determines (changes) the STA 200B as a destination of the BAR (547) on the basis of the content of the Alert frame. Then, the AP 100 transmits the BAR to the STA 200B determined as the destination of the BAR (530).

[Exemplary Operation of Base Station]

FIG. 13 is a flowchart illustrating an example of a processing procedure of a BAR destination determination processing by the AP 100 according to the first embodiment of the present technology. In FIG. 13, an example of operation is illustrated in a case where a statistical information notifying period notified to the STA 200 is started.

First, the control unit 130 of the AP 100 determines whether the statistical information notifying period has ended (step S801). If the statistical information notifying period has not ended (step S801), monitoring is continued.

If the statistical information notifying period has ended (step S801), the control unit 130 of the AP 100 determines the number of destinations of a BAR on the basis of congestion degree information (congestion degree information 398 illustrated in FIG. 8) included in an Alert frame transmitted from the STA 200 (step S802).

For example, in a case where a congestion degree specified on the basis of the congestion degree information is higher than a reference of a threshold value th1, the number of destinations of the BAR can be reduced. On the other hand, in a case where the congestion degree is lower than a reference of a threshold value th2 (where th2<th1), the number of destinations of the BAR can be increased. Furthermore, in a case where the congestion degree is between the threshold values th1 and th2, it can be determined to maintain the number of destinations of the BAR.

Note that in a case where an Alert frame is transmitted from a plurality of STAs 200, it is possible to determine the number of destinations of the BAR using each piece of congestion degree information included in each of the Alert frames. For example, it is possible to use an average value of the congestion degrees specified on the basis of the congestion degree information. Alternatively, for example, the lowest value or the highest value among the congestion degrees specified on the basis of the congestion degree information can be used.

Furthermore, in a case where the AP 100 can acquire congestion degree information, the number of destinations of the BAR may be determined using the congestion degree information acquired by the AP 100.

Subsequently, the control unit 130 of the AP 100 determines destinations of the BAR on the basis of the statistical information (notification information) included in the Alert frames transmitted from STAs 200 (step S803). Here, the control unit 130 of the AP 100 determines destinations of the BAR within the range of the number of destinations of the BAR determined in step S802 (step S803).

For example, in a case where the number of destinations of the BAR determined in step S802 is the same as the number of STAs 200 having transmitted the Alert frame, all the STAs 200 that have transmitted the Alert frame can be determined as a destination of the BAR.

Furthermore, for example, in a case where the number of STAs 200 having transmitted the Alert frame is smaller than the number of destinations of the BAR determined in step S802, all the STAs 200 that have transmitted the Alert frame can be determined as a destination of the BAR. In this case, the same number of STAs 200 as the number of destinations of the BAR determined in step S802 may be determined as the destination of the BAR. For example, an STA 200 can be randomly selected from among STAs 200 that have not transmitted the Alert frame until the number of STAs 200 reaches the same number as the number of destinations of the BAR determined in the step S802, and the STA 200 can be set as the destination of the BAR.

Furthermore, for example, in a case where the number of STAs 200 having transmitted the Alert frame is larger than the number of destinations of the BAR determined in step S802, destinations of the BAR are determined from among the STAs 200 that have transmitted the Alert frame. For example, the AP 100 grasps a reception characteristic of an STA 200 on the basis of statistical information (notification information) included in the Alert frame. Then, the AP 100 can determine destinations of the BAR in the order of poor reception characteristic.

Here, in the case where the destinations of the BAR is determined in ascending order of reception characteristic, it is also assumed that an STA having an excessively poor reception characteristic is determined as the destination of the BAR. In this case, the number of times of redundant retransmission increases, possibly degrading the overall characteristics. Therefore, instead of determining the destination of the BAR in ascending order of reception characteristic, the destination of the BAR may be determined by another determination method. For example, the AP 100 can determine an STA a reception characteristic of which falls within a certain range as the destination of the BAR.

Moreover, in order to prevent an STA having an excessively poor reception characteristic from being determined as a destination of the BAR, for example, the AP 100 may set a plurality of threshold values for transmitting the Alert such that the STA having an excessively poor reception does not to transmit the Alert frame. That is, the AP 100 can transmit a plurality of threshold values to STAs. In this case, for example, in a case where an STA has a reception characteristic poorer than a first threshold value, the STA transmits an Alert frame. In a case where the reception characteristic is poorer than a second threshold value (value poorer than the first threshold), however, the STA does not transmit the Alert frame.

Furthermore, for example, in a case where an STA having an excessively poor reception characteristic also transmits an Alert frame, the AP 100 may exclude the STA having an excessively poor reception characteristic (for example, an STA having a reception characteristic poorer than the second threshold value) from destinations of the BAR. Note that steps S 801 to S 803 are an example of a control procedure of determining described in the claims.

[Exemplary Operation of STA]

Figure 14:
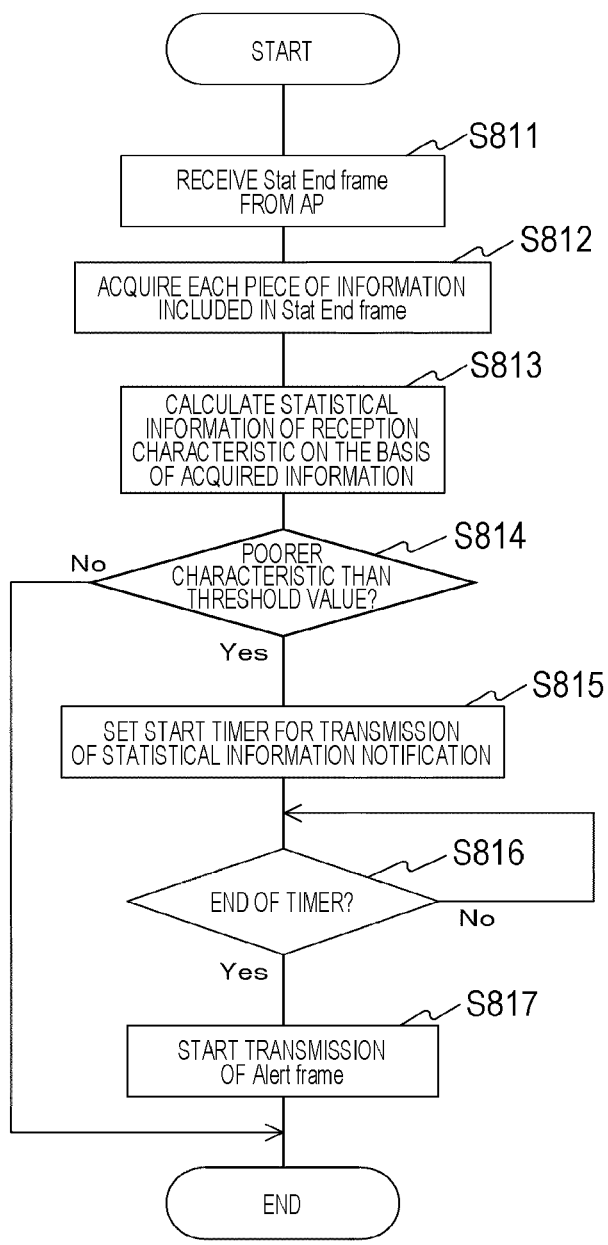
FIG. 14 is a flowchart illustrating an example of a processing procedure of Alert frame transmission processing by the STA 200 according to the first embodiment of the present technology.

FIG. 14 is a flowchart illustrating an example of a processing procedure of Alert frame transmission processing by an STA 200 according to the first embodiment of the present technology.

First, the control unit 230 of the STA 200 receives a Stat End frame from the AP 100 (step S811). Subsequently, the control unit 230 of the STA 200 acquires each piece of information (for example, each of the pieces of information illustrated in a of FIG. 6) included in the received Stat End frame (step S812).

Subsequently, the control unit 230 of the STA 200 calculates statistical information regarding a reception characteristic on the basis of each of the pieces of information included in the Stat End frame (step S813). In this case, the control unit 230 of the STA 200 can acquire information measured during a statistical period specified on the basis of the information included in the Stat End frame and calculate the statistical information (notification information) on the basis of this information.

Subsequently, the control unit 230 of the STA 200 determines whether the statistical information obtained by the calculation is poorer than a threshold value (for example, the threshold value 322 of an index indicating a reception characteristic illustrated in FIG. 6) specified on the basis of the information included in the Stat End frame (step S814).

If the statistical information is better than the threshold value (step S814), it is not necessary to transmit the Alert frame, and thus the operation of the Alert frame transmission processing is terminated.

If the statistical information is poorer than the threshold value (step S814), the control unit 230 of the STA 200 sets a start timer for transmission of a statistical information notification (step S815). In this case, the control unit 230 of the STA 200 can set the start timer for transmission of a statistical information notification on the basis of statistical information notification start time and random delay time for collision avoidance.

Subsequently, the control unit 230 of the STA 200 determines whether the set the start timer for transmission of a statistical information notification has ended (step S816). In addition, if the start timer for transmission of a statistical information notification has not ended (step S816), monitoring is continued.

If the set start timer for transmission of a statistical information notification has ended (step S816), the control unit 230 of the STA 200 starts transmission of the Alert frame (step S817). In this case, the control unit 230 of the STA 200 includes each of the pieces of information (for example, each of the pieces of information illustrated in FIG. 8) requested for notification from the AP 100 in an Alert frame and thereby transmits the information (step S817). Note that steps S 811 to S 817 are an example of a control procedure of transmitting described in the claims.

<2. Second Embodiment>

In a second embodiment of the present technology, an example in which an AP transmits a Stat Initiate frame and a Stat End frame to STAs is illustrated.

Note that configurations of the AP and the STAs in the second embodiment of the present technology are substantially the same as those of the AP 100 and the STA 200 illustrated in FIGS. 1 to 3 and elsewhere. Therefore, a part common to that of the first embodiment of the present technology is denoted by the same symbol as that of the first embodiment of the present technology, and a part of descriptions thereof will be omitted.

[Exemplary Communication Using Stat Initiate Frame and Stat End Frame]

Figure 15:
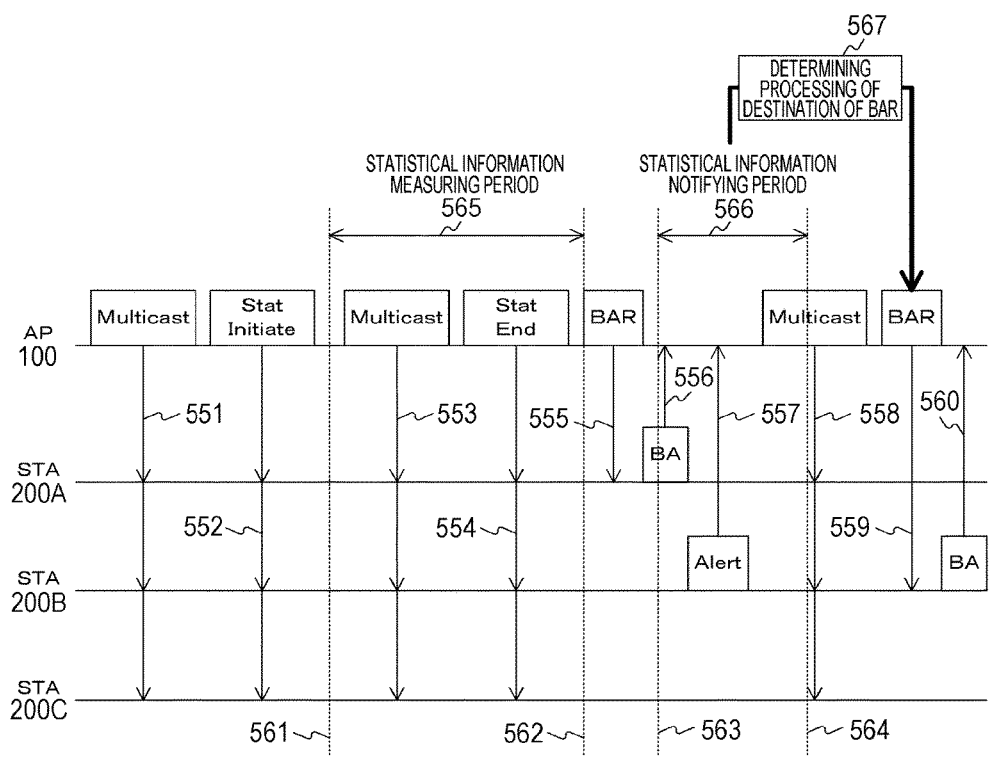
FIG. 15 is a diagram schematically illustrating data exchanged among devices according to a second embodiment of the present technology and a statistical information measuring period and a statistical information notifying period set to the STAs 200A to 200C.

FIG. 15 is a diagram schematically illustrating data exchanged among the devices according to the second embodiment of the present technology and a statistical information measuring period and a statistical information notifying period set to STAs 200A to 200C.

In FIG. 15, an example is illustrated in which the STAs 200A to 200C start acquisition of statistical information at a timing when a Stat Initial frame is received from the AP 100. Furthermore, in FIG. 15, an example is illustrated in which each of the STAs 200A to 200C determines whether each of the STAs 200A to 200C satisfies a transmission criteria of an Alert frame each time a Stat End frame is received from the AP 100 and transmits an Alert frame to the AP 100 in a case where the criteria is satisfied. Moreover, in FIG. 15, an example is illustrated in which a decision to transmit a BAR first to the STA 200A is made.

In this manner, by using the Stat Initiate frame and the Stat End frame, processing on the STA 200 side can be simplified. For example, in the first embodiment of the present technology, since the notification by the Stat End frame is performed at a timing when the statistical period ends, it is not necessary to manage and store the STA 200 in association with a statistical value and a timestamp at a timing when the statistical value is updated. On the other hand, in the second embodiment of the present technology, since a timing for starting statistics is explicitly notified, management thereof and the like can be omitted. That is, since the STA 200 is only required to simply count a statistical value, it is possible to simplify processing on the STA 200 side.

Here, an exemplary configuration of a Stat Initiate frame will be described. The configuration of the Stat Initiate frame can include, for example, frames similar to those of the Stat End frame (for example, as illustrated in FIG. 7). For example, in the exemplary configuration illustrated in FIG. 7, the information requested for notification 373 may be stored, and the information 371 regarding the statistical information measuring period and the information 372 regarding the statistical information notifying period may be omitted. In this manner, at least the information requested for notification is included in the Stat Initiate frame for transmission.

An exemplary configuration of a Stat End frame will also be described. The configuration of the Stat End frame can be, for example, a frame (for example, illustrated in FIG. 7) similar to the Stat End frame in the first embodiment of the present technology. For example, in the exemplary configuration illustrated in FIG. 7, the information 371 regarding the statistical information measuring period and the information 372 regarding the statistical information notifying period can be stored, and the information requested for notification 373 can be omitted. That is, since the information requested for notification 373 is included in the Stat Initiate frame and thereby transmitted, storage in the Stat End frame can be omitted.

Here, the information regarding the statistical information notifying period stored in the Stat End frame in the second embodiment of the present technology is similarly to that of the first embodiment of the present technology. However, the information regarding the statistical information measuring period stored in the Stat End frame according to the second embodiment of the present technology is different from that of the first embodiment of the present technology. For example, a start and an end of acquisition of statistical information can be implicitly communicated to the STA 200 by transmission of the Stat Initiate frame and the Stat End frame. Therefore, the information regarding the statistical information measuring period stored in the Stat End frame in the second embodiment of the present technology can be limited to the interval 303 to the restart of statistics and the number of times of statistical measurement 304.

Here, it is also assumed that the Stat Initiate frame and the Stat End frame are transmitted every time. In this case, it is not necessary to include the information regarding the statistical information measuring period in the Stat End frame.

Moreover, since other configurations of the Stat End frame is similar to that of the first embodiment of the present technology, descriptions thereof are omitted here.

Similarly to FIG. 11, the AP 100 and the STAs 200A to 200C perform multicasting (551, 553) and BAR transmission (555). Moreover, the STA 200A having received the BAR transmits a BA (556).

Moreover, the AP 100 transmits a Stat Initiate frame at a timing when a statistical information measuring period 565 starts (552). Furthermore, the STAs 200A to 200C receive the Stat Initiate frame (552). As described above, this Stat Initiate frame includes information requested for notification.

Moreover, the STAs 200A to 200C can grasp the statistical information measuring period 565 on the basis of a reception timing of the Stat Initiate frame. In FIG. 15, a start point of the statistical information measuring period 565 is indicated by a dotted line 561.

Moreover, the AP 100 transmits a Stat End frame at a timing when the statistical information measuring period 565 ends (554). Furthermore, the STAs 200A to 200C receive the Stat End frame (554). As described above, the Stat End frame includes the information regarding the statistical information measuring period and the information regarding the statistical information notifying period.

Moreover, the STAs 200A to 200C can grasp the end of the statistical information measuring period 565 on the basis of a reception timing of the Stat End frame. In FIG. 15, an endpoint of the statistical information measuring period 565 is indicated by a dotted line 562.

Moreover, the STAs 200A to 200C can grasp a statistical information notifying period 566 on the basis of the information regarding the statistical information notifying period included in the Stat End frame. In FIG. 15, a start point of a statistical information notifying period 566 is indicated by a dotted line 563, and an endpoint is indicated by a dotted line 564.

Moreover, each of the STAs 200A to 200C determines whether each of the STAs 200A to 200C is to transmit an Alert frame on the basis of information acquired in the statistical information measuring period 565 (information requested for notification by the AP 100). Then, in a case where it is determined that an Alert frame is transmitted, the STAs 200A to 200C include information to be notified to the AP 100 (statistical information (notification information)) in the Alert frame to transmit the information. In FIG. 15, an example is illustrated in which the STA 200B determines to transmit an Alert frame and transmits an Alert frame to the AP 100 (557).

In a case where the AP 100 receives the Alert frame, the AP 100 determines (changes) a destination of the BAR on the basis of the content of the Alert frame (567). For example, a case is assumed where the AP 100 has determined the STA 200A as the destination of the BAR (555) and that the AP 100 has received an Alert frame from the STA 200B (557). In this case, the AP 100 determines (changes) the STA 200B as a destination of the BAR (567) on the basis of the content of the Alert frame. Then, the AP 100 transmits the BAR to the STA 200B determined as the destination of the BAR (559).

<3. Third Embodiment>

In a third embodiment of the present technology, an example is illustrated in which an AP transmits a Stat Initiate frame to STAs.

Note that configurations of the AP and the STAs in the third embodiment of the present technology are substantially the same as those of the AP 100 and the STA 200 illustrated in FIGS. 1 to 3 and elsewhere. Therefore, a part common to that of the first embodiment of the present technology is denoted by the same symbol as that of the first embodiment of the present technology, and a part of descriptions thereof will be omitted.

[Exemplary Communication Using Stat Initiate Frame]

Figure 16:
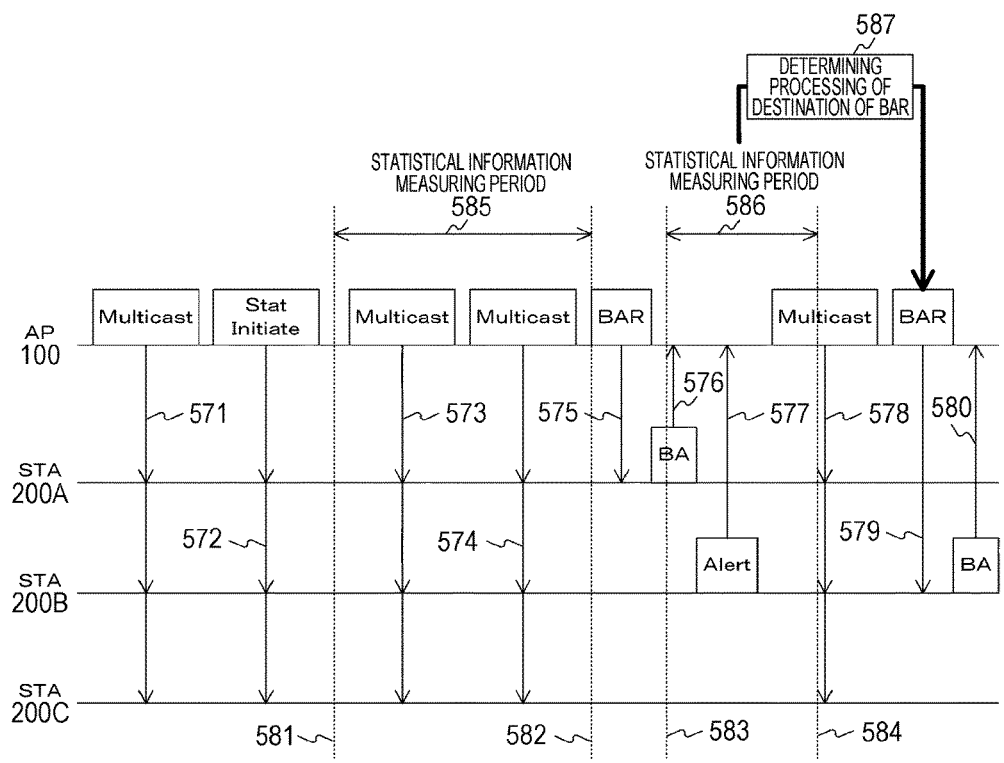
FIG. 16 is a diagram schematically illustrating data exchanged among devices according to a third embodiment of the present technology and a statistical information measuring period and a statistical information notifying period set to the STAs 200A to 200C.

FIG. 16 is a diagram schematically illustrating data exchanged among the devices according to the third embodiment of the present technology and a statistical information measuring period and a statistical information notifying period set to STAs 200A to 200C.

In FIG. 16, an example is illustrated in which the STAs 200A to 200C start acquisition of statistical information after a Stat Initial frame is received from the AP 100. Moreover, in FIG. 16, an example is illustrated in which the STAs 200A to 200C continuously perform acquisition of statistical information until end time specified on the basis of information stored in the Stat Initial frame. Moreover, an example is illustrated in which each of the STAs 200A to 200C determines whether each of the STAs 200A to 200C satisfies a transmission criteria of an Alert frame each time a statistical information measuring period ends and transmits an Alert frame to the AP 100 in a case where the criteria is satisfied.

In this manner, by using only the Stat Initiate frame, it is possible to simplify processing on the STA 200 side in a similar manner as in the second embodiment of the present technology. Furthermore, an overhead can be reduced as compared with the second embodiment of the present technology.

Here, an exemplary configuration of a Stat Initiate frame will be described. The configuration of the Stat Initiate frame can include, for example, frames similar to those of the Stat End frame (for example, as illustrated in FIG. 7). For example, similarly to the exemplary configuration illustrated in FIG. 7, it is possible to store the information 371 regarding the statistical information measuring period, the information 372 regarding the statistical information notifying period, and the information requested for notification 373.

Here, information stored in the Stat Initiate frame (information requested for notification 373) according to the third embodiment of the present technology is different from the first and second embodiments of the present technology. For example, in the third embodiment of the present technology, the AP 100 may not be able to grasp to what extent multicast packets are transmitted at a start point of acquisition of statistical information. Therefore, in the third embodiment of the present technology, the AP 100 needs to estimate a threshold value of an index indicating a reception characteristic.

For example, the AP 100 can estimate the threshold value on the basis of a characteristic indicated by a multicast traffic (traffic specification (TSPEC)) and the statistical information measuring period. Furthermore, the estimated threshold value can be notified to the STA 200.

Moreover, since other configurations of the Stat Initiate frame is similar to that of the first embodiment of the present technology, descriptions thereof are omitted here.

Similarly to FIG. 11, the AP 100 and the STAs 200A to 200C perform multicasting (571, 573, and 574) and BAR transmission (575). Moreover, the STA 200A having received the BAR transmits a BA (576).

Moreover, the AP 100 transmits a Stat Initiate frame at a timing when a statistical information measuring period 585 starts (572). Furthermore, the STAs 200A to 200C receive the Stat Initiate frame (572). As described above, the Stat Initiate frame includes the information regarding the statistical information measuring period, the information regarding the statistical information notifying period, and the information requested for notification.

Moreover, the STAs 200A to 200C can grasp the statistical information measuring period 585 on the basis of a reception timing of the Stat Initiate frame. In FIG. 16, a start point of a statistical information measuring period 585 is indicated by a dotted line 581, and an end point is indicated by a dotted line 582.

Moreover, the STAs 200A to 200C can grasp a statistical information notifying period 586 on the basis of the information regarding the statistical information notifying period included in the Stat Initiate frame. In FIG. 16, a start point of a statistical information notifying period 586 is indicated by a dotted line 583, and an endpoint is indicated by a dotted line 584.

Moreover, each of the STAs 200A to 200C determines whether each of the STAs 200A to 200C is to transmit an Alert frame on the basis of information acquired in the statistical information measuring period 585 (information requested for notification by the AP 100). Then, in a case where it is determined that an Alert frame is transmitted, the STAs 200A to 200C include information to be notified to the AP 100 (statistical information (notification information)) in the Alert frame to transmit the information. In FIG. 16, an example is illustrated in which the STA 200B determines to transmit an Alert frame and transmits an Alert frame to the AP 100 (577).

In a case where the AP 100 receives the Alert frame, the AP 100 determines (changes) a destination of the BAR on the basis of the content of the Alert frame (587). For example, a case is assumed where the AP 100 has determined the STA 200A as the destination of the BAR (575) and that the AP 100 has received an Alert frame from the STA 200B (577). In this case, the AP 100 determines (changes) the STA 200B as a destination of the BAR (587) on the basis of the content of the Alert frame. Then, the AP 100 transmits the BAR to the STA 200B determined as the destination of the BAR (579).

[Other Embodiments]

Here, an example of implicit notification of a start and an end (or duration) of a statistical information measuring period is illustrated.

In the third embodiment of the present technology, the example is illustrated in which the AP transmits a Stat Initiate frame to the STA, and a start and an end (or duration) of the statistical information measuring period are thereby explicitly notified by the Stat Initiate frame. However, a start and an end (or duration) of the statistical information measuring period may be implicitly notified by reception of the Stat Initiate frame and the Stat End frame.

For example, the STA can implicitly start measurement of statistical information at a timing of receiving the Stat Initiate frame and can implicitly end the measurement of the statistical information at a timing of receiving the Stat End Frame. In this case, it is not necessary to include the information regarding the statistical information measuring period in the Stat Initiate frame. Therefore, for example, it is possible to express an index indicating a reception characteristic by bits of a MAC header of a multicast data frame and to notify the start of the measurement of the statistical information using the multicast data frame.

[About Error Processing]

Here, in the second embodiment of the present technology, an STA that has failed to receive at least one of the Stat Initiate frame and the Stat End frame needs to perform error processing. Therefore, here, the error processing will be described.

For example, a case is assumed where that the STA has failed to receive a frame for notifying the start of the statistical information measuring period but receives a frame corresponding to the frame (a frame for notifying the end of the statistical information measuring period). In this case, the STA discards the frame for notifying the end of the statistical information measuring period and performs nothing.

Furthermore, for example, a case is assumed where that the STA has received a frame for notifying the start of the statistical information measuring period but failed to receive a frame corresponding to the frame (a frame for notifying the end of the statistical information measuring period). In this case, the STA starts measurement processing of the statistical information regarding the basis of the frame for notifying the start of the statistical information measuring period but terminates the processing due to timeout.

In this manner, it is also assumed that the STA fails to receive at least one of the plurality of frames for notifying the statistical information measuring period (or the statistical information notifying period). Therefore, in such a case, the STA can perform control related to the measurement processing of the statistical information regarding the basis of a frame failed to be received. For example, the STA can perform timeout after measurement processing of the statistical information, discard of other frames successfully received, or other processing on the basis of the frame failed to be received.

Here, as described above, in multicasting there is a method of requesting an ACK to an STA in a multicast group and performing retransmission control in order to enhance reliability. However, in a case where the number of STAs in the multicast group increases, requesting an ACK to all the STAs may disadvantageously result in an excessively large overhead. Therefore, selecting an STA requesting an ACK from among the STAs in the multicast group allows the overhead to be reduced. For example, which STA to select greatly affects the characteristics of the multicasting. For this reason, it is desirable to select STAs in ascending order of reception characteristic.

Therefore, in the embodiment of the present technology, a period for measuring the information regarding the communication state of an STA (information regarding a reception characteristic) and a timing for measurement are allowed to be concurrent among the STAs in the multicast group. As a result, each of the STAs can appropriately determine whether transmission of a frame (for example, Alert frame) requesting transmission of a BAR is necessary.

Furthermore, a period is set during which each of the STAs in the multicast group can transmit information regarding the communication state (information regarding reception characteristic). As a result, each of the STAs can transmit a frame (for example, an Alert frame) requesting transmission of a BAR at an appropriate timing.

Moreover, the AP 100 can cause only an STA having a low reception characteristic to transmit the frame (for example, an Alert frame) requesting transmission of the BAR Moreover, the AP 100 can cause an STA to transmit the information regarding the communication state (information regarding a reception characteristic) acquired in the same period to acquire the information. That is, it is possible to cause only the STA having a low reception characteristic to transmit information regarding the communication state (information regarding the reception characteristic) acquired in the same period. As a result, the AP 100 can adaptively determine an STA to which the BAR is transmitted.

In this manner, the STA having a bad reception condition can request the AP 100 to start transmission of the BAR. As a result, the AP 100 can determine an STA to which the BAR is transmitted depending on the environment with a small amount of overhead. Moreover, these overheads can be reduced, and characteristics of the entire multicast group can be enhanced.

As described above, according to the embodiments of the present technology, it is possible to implement a protocol for acquiring the information (information regarding the communication state) for determining a destination of the BAR. Furthermore, it is possible to appropriately determine a destination of a delivery confirmation request (for example, BAR).

Furthermore, the AP 100 and STAs 200 according to the embodiments of the present technology can be applied to devices used in different fields. For example, application to a wireless device (for example, a car navigation device and a smartphone) used in a car is possible. Furthermore, for example, application to inter-vehicle communication or road-vehicle communication (vehicle to X (V2X)) is possible. Furthermore, for example, application to a learning device (for example, a tablet terminal) used in the educational field is possible. Furthermore, for example, application to a wireless device used in the agricultural field (for example, a terminal of a cattle management system) is possible. Likewise, applications to respective wireless devices used in the field of sports, the medical field, etc. are possible.

<4. Application Example>

The technology according to the present disclosure can be applied to various products. For example, the wireless communication devices 100 and 200 may be implemented as a mobile terminal such as a smartphone, a tablet personal computer (PC), a laptop PC, a portable game terminal, or a digital camera, a fixed terminal such as a television receiver, a printer, a digital scanner, or a network storage, or as an in-vehicle terminal such as a car navigation device. Moreover, the wireless communication devices 100 and 200 may be implemented as a terminal that performs machine to machine (M2M) communication (also referred to as machine type communication (MTC) terminal) such as smart meter, a vending machine, a remote monitoring device, or a point of sale (POS) terminal. Furthermore, the wireless communication devices 100 and 200 may be a wireless communication module (for example, an integrated circuit module including one die) mounted on these terminals.

On the other hand, for example, the wireless communication device (communication control device) 100 may be implemented as a wireless LAN access point (also referred to as a wireless base station) having a router function or not having a router function. Furthermore, the wireless communication device (communication control device) 100 may be implemented as a mobile wireless LAN router. Furthermore, the wireless communication device (communication control device) 100 may be a wireless communication module (for example, an integrated circuit module including one die) mounted to these devices.

[4-1. First Application Example]

Figure 17:
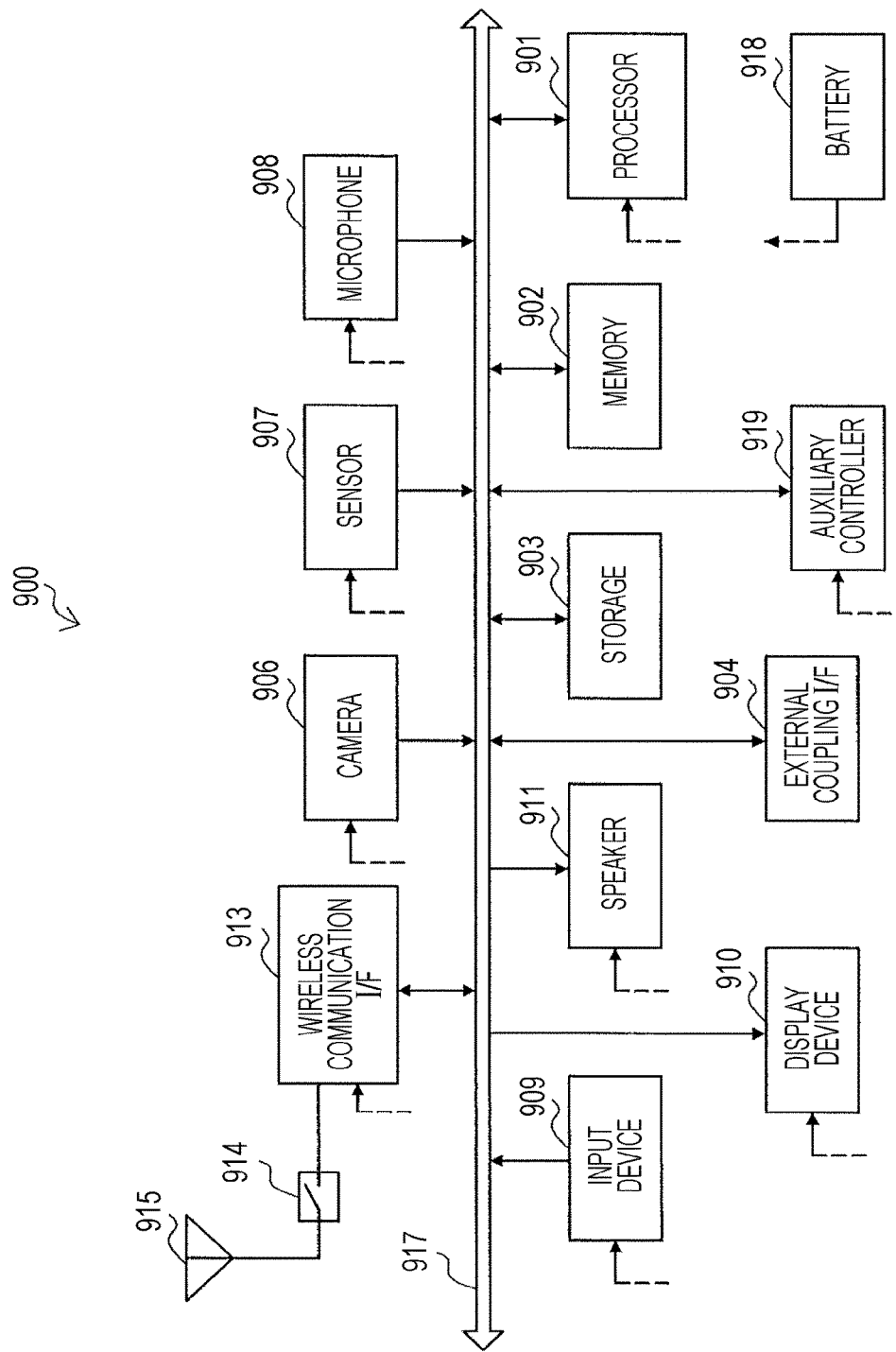
FIG. 17 is a block diagram illustrating an example of a schematic configuration of a smartphone.

FIG. 17 is a block diagram illustrating an example of a schematic configuration of a smartphone 900 to which the technique according to the present disclosure can be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC) and controls functions of the application layer and other layers of the smartphone 900. The memory 902 includes a random access memory (RAM) and a read only memory (ROM) and stores a program and data executed by the processor 901. The storage 903 may include a storage medium such as a semiconductor memory or a hard disk. The external coupling interface 904 is for coupling an external device such as a memory card or a universal serial bus (USB) device to the smartphone 900.

The camera 906 has, for example, an imaging element such as a charge coupled device (CCD) or a complementary metal oxide semiconductor (CMOS) and generates a captured image. The sensor 907 may include a group of sensors such as a positioning sensor, a gyro sensor, a geomagnetic sensor, and an acceleration sensor, for example. The microphone 908 converts sound input to the smartphone 900 into an audio signal. The input device 909 includes, for example, a touch sensor for detecting a touch on the screen of the display device 910, a keypad, a keyboard, a button, a switch, or other components and accepts an operation or information input by a user. The display device 910 has a screen such as a liquid crystal display (LCD) or an organic light emitting diode (OLED) display and displays an output image of the smartphone 900. The speaker 911 converts an audio signal output from the smartphone 900 into sound.

The wireless communication interface 913 supports one or more wireless LAN standards such as IEEE 802.11a, 11b, 11g, 11n, 11ac, and 11ad and executes wireless communication. In an infrastructure mode, the wireless communication interface 913 can communicate with other devices via a wireless LAN access point. Furthermore, the wireless communication interface 913 can directly communicate with other devices in an ad hoc mode or a direct communication mode such as Wi-Fi Direct. Note that in Wi-Fi Direct, unlike the ad hoc mode, one of two terminals operates as an access point; however, communication is performed directly between the terminals. The wireless communication interface 913 may typically include a baseband processor, a radio frequency (RF) circuit, a power amplifier, and other components. The wireless communication interface 913 may be a one-chip module in which a memory for storing a communication control program, a processor for executing the program, and a related circuit are integrated. In addition to the wireless LAN method, the wireless communication interface 913 may support other types of wireless communication methods such as a near field communication method, a proximity wireless communication method, and a cellular communication method. The antenna switch 914 switches a connection destination of the antenna 915 among a plurality of circuits (for example, circuits for different wireless communication methods) included in the wireless communication interface 913. The antenna 915 has a single or a plurality of antenna elements (for example, a plurality of antenna elements forming an MIMO antenna) and is used for transmission and reception of radio signals by the wireless communication interface 913.

Note that, without being limited to the example illustrated in FIG. 17, the smartphone 900 may include a plurality of antennas (for example, an antenna for a wireless LAN and an antenna for a proximity wireless communication method). In that case, the antenna switch 914 may be omitted in the configuration of the smartphone 900.

The bus 917 connects the processor 901, the memory 902, the storage 903, the external coupling interface 904, the camera 906, the sensor 907, the microphone 908, the input device 909, the display device 910, the speaker 911, the wireless communication interface 913 and the auxiliary controller 919 to each other. The battery 918 supplies electric power to each block of the smartphone 900 illustrated in FIG. 17 via a power supply line partially indicated by a broken line in the drawing. For example, the auxiliary controller 919 allows the minimum required functions of the smartphone 900 to operate in a sleep mode.

In the smartphone 900 illustrated in FIG. 17, the control unit 130 described with reference to FIG. 2 and the control unit 230 described with reference to FIG. 3 may be implemented in the wireless communication interface 913. Moreover, at least a part of these functions may be implemented in the processor 901 or the auxiliary controller 919. For example, it is possible to reduce power consumption of the battery 918 by determining whether transmission of the Alert frame is necessary on the basis of information regarding a communication state.

Note that the smartphone 900 may operate as a wireless access point (software AP) with the processor 901 executing an access point function at the application level. Furthermore, the wireless communication interface 913 may have a wireless access point function.

[4-2. Second Application Example]

Figure 18:
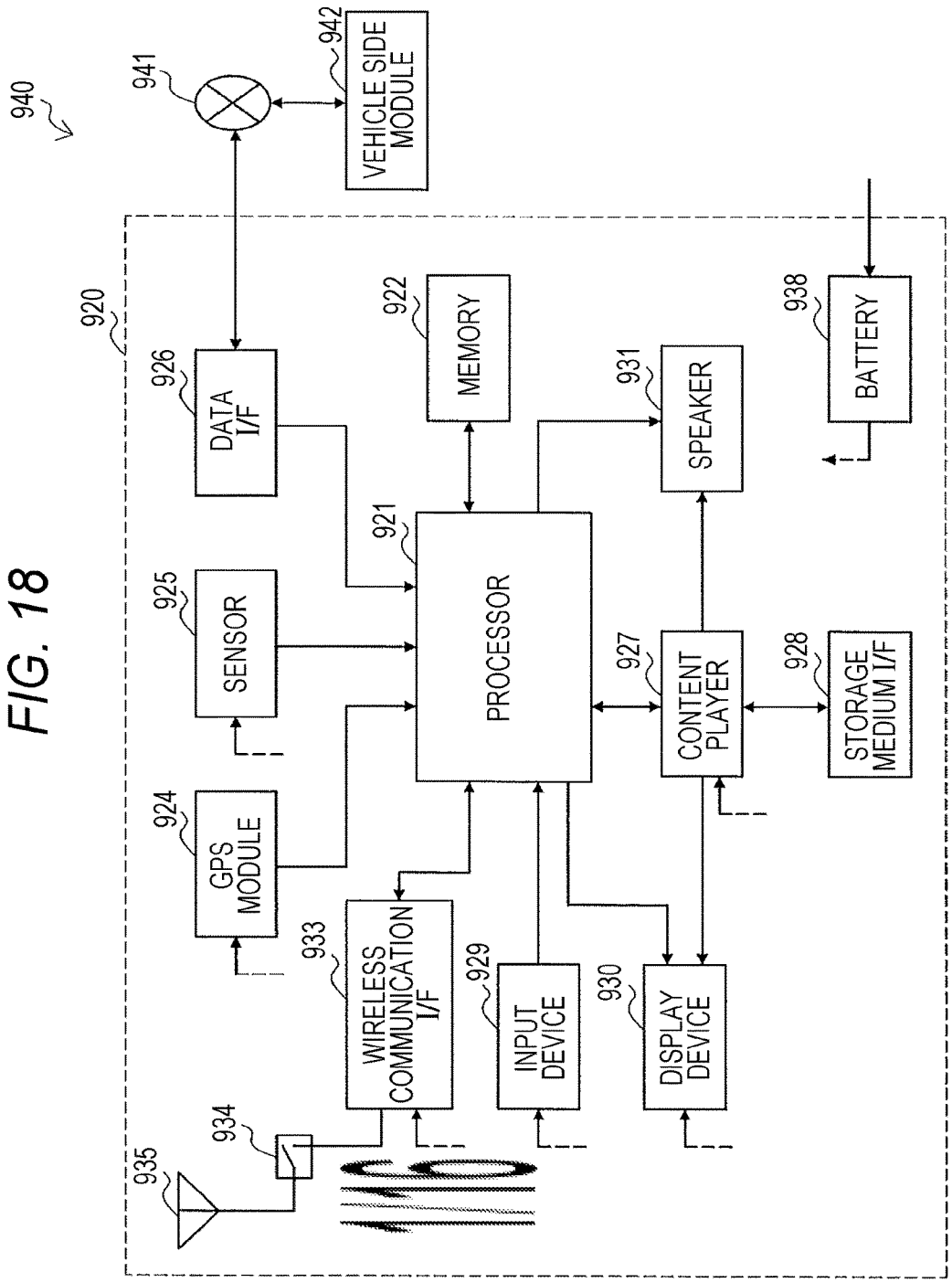
FIG. 18 is a block diagram illustrating an example of a schematic configuration of a car navigation device.

FIG. 18 is a block diagram illustrating an example of a schematic configuration of a car navigation device 920 to which the technique according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or a SoC and controls a navigation function and other functions of the car navigation device 920. The memory 922 includes a RAM and a ROM and stores a program and data executed by the processor 921.

The GPS module 924 measures the position (for example, latitude, longitude, and altitude) of the car navigation device 920 using GPS signals received from the GPS satellites. The sensor 925 may include a group of sensors such as a gyro sensor, a geomagnetic sensor, and an atmospheric pressure sensor. The data interface 926 is coupled to an in-vehicle network 941 via, for example, a terminal (not illustrated) and acquires data generated on the vehicle side such as vehicle speed data.

The content player 927 reproduces the content stored in a storage medium (for example, a CD or a DVD) inserted in the storage medium interface 928. The input device 929 includes, for example, a touch sensor for detecting a touch on the screen of the display device 930, a button, a switch, or other components and accepts an operation or information input by a user. The display device 930 has a screen such as an LCD or an OLED display and displays a navigation function or an image of the content reproduced. The speaker 931 outputs sound of the navigation function or the content reproduced.

The wireless communication interface 933 supports one or more wireless LAN standards such as IEEE 802.11a, 11b, 11g, 11n, 11ac, and 11ad and executes wireless communication. In an infrastructure mode, the wireless communication interface 933 can communicate with other devices via a wireless LAN access point. Furthermore, the wireless communication interface 933 can directly communicate with other devices in an ad hoc mode or a direct communication mode such as Wi-Fi Direct. The wireless communication interface 933 may typically include a baseband processor, an RF circuit, a power amplifier, and other components. The wireless communication interface 933 may be a one-chip module in which a memory for storing a communication control program, a processor for executing the program, and a related circuit are integrated. In addition to the wireless LAN method, the wireless communication interface 933 may support other types of wireless communication methods such as a near field communication method, a proximity wireless communication method, and a cellular communication method. The antenna switch 934 switches a connection destination of the antenna 935 among a plurality of circuits included in the wireless communication interface 933. The antenna 935 has a single or a plurality of antenna elements and is used for transmission and reception of radio signals by the wireless communication interface 933.

Note that, without being limited to the example of FIG. 18, the car navigation device 920 may include a plurality of antennas. In this case, the antenna switch 934 may be omitted in the configuration of the car navigation device 920.

The battery 938 supplies electric power to each block of the car navigation device 920 illustrated in FIG. 18 via a power supply line partially indicated by a broken line in the drawing. Furthermore, the battery 938 accumulates power supplied from the vehicle side.

In the car navigation device 920 illustrated in FIG. 18, the control unit 130 described with reference to FIG. 2 and the control unit 230 described with reference to FIG. 3 may be implemented in the wireless communication interface 933. Moreover, at least a part of these functions may be implemented in the processor 921. For example, it is possible to reduce the power consumption by determining whether transmission of an Alert frame is necessary on the basis of the information regarding the communication state.

Furthermore, the wireless communication interface 933 may operate as the wireless communication device (communication control device) 100 described above and provide a wireless connection to a terminal possessed by a user in the vehicle.

Moreover, the technique according to the present disclosure may be implemented as an in-vehicle system (or vehicle) 940 including one or more blocks of the car navigation device 920 described above, the in-vehicle network 941, and a vehicle side module 942. The vehicle side module 942 generates vehicle-side data such as the vehicle speed, the engine speed, or failure information and outputs the generated data to the in-vehicle network 941.

[4-3. Third Application Example]

Figure 19:
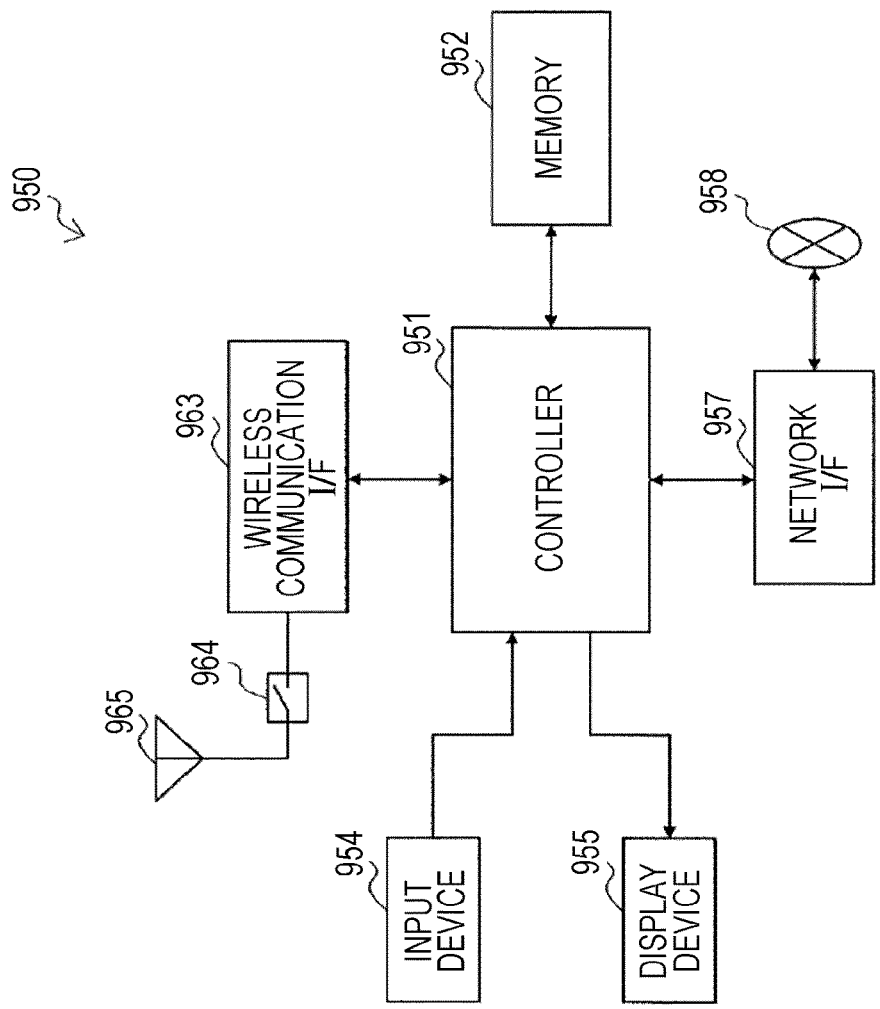
FIG. 19 is a block diagram illustrating an example of a schematic configuration of a wireless access point.

FIG. 19 is a block diagram illustrating an example of a schematic configuration of a wireless access point 950 to which the technique according to the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access restriction, routing, encryption, firewall, log management, and other functions) of layers above the Internet protocol (IP) layer of the wireless access point 950. The memory 952 includes a RAM and a ROM and stores a program executed by the controller 951 and various control data (for example, a list of terminals, a routing table, an encryption key, security setting, and a log).

The input device 954 includes, for example, a button or a switch and accepts an operation by a user. The display device 955 includes an LED lamp and the like and displays an operation status of the wireless access point 950.

The network interface 957 is a wired communication interface for the wireless access point 950 to be coupled a wired communication network 958. The network interface 957 may have a plurality of coupling terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad and provides wireless connection to neighboring terminals as an access point. The wireless communication interface 963 may typically include a baseband processor, an RF circuit, a power amplifier, and other components. The wireless communication interface 963 may be a one-chip module in which a memory for storing a communication control program, a processor for executing the program, and a related circuit are integrated. The antenna switch 964 switches a connection destination of the antenna 965 among a plurality of circuits included in the wireless communication interface 963. The antenna 965 has a single or a plurality of antenna elements and is used for transmission and reception of radio signals by the wireless communication interface 963.

In the wireless access point 950 illustrated in FIG. 19, the control unit 130 described with reference to FIG. 2 may be implemented in the wireless communication interface 963. Moreover, at least a part of these functions may be implemented in the controller 951. For example, it is possible to reduce the power consumption by determining whether transmission of an Alert frame is necessary on the basis of the information regarding the communication state.

Note that the embodiments described above illustrate an example for embodying the present technology, and matters of the embodiments and matters specifying the invention in the claims correspond with each other. Likewise, matters specifying the invention in the claims and matters of the embodiments of the present technology denoted by the same names as those thereof correspond with each other. However, the present technology is not limited to the embodiments, and can be embodied by applying various modifications to the embodiments without departing from the principles thereof.

Moreover, the processing procedure described in the above embodiments may be regarded as a method having a series of the procedures, or as a program for causing a computer to execute a series of the procedures or as a recording medium for storing the program. As this recording medium, for example, a compact disc (CD), a mini disc (MD), a digital versatile disc (DVD), a memory card, a Blu-ray (registered trademark) disc, or the like may be used.

Note that the effects described herein are merely examples and thus are limited. Other effects may also be included.

Note that the present technology may employ configurations as follows.

(1)

A communication control device, including a control unit for performing control to notify an information processing device of a period for the information processing device to acquire information regarding a communication state in the information processing device, to cause the information processing device to notify the information regarding the communication state acquired in the period, and to determine a destination of a delivery confirmation request on the basis of the information regarding the communication state.

(2)

The communication control device according to item (1), in which the control unit performs control to cause the information processing device to transmit the information regarding the communication state in a case where the information processing device determines that the information regarding the communication state acquired in the period satisfies a predetermined condition.

(3)

The communication control device according to item (1) or (2), in which at least one piece of information regarding the communication state acquired in the period is a reception characteristic in the information processing device, and the control unit causes the information processing device to determine whether the reception characteristic in the information processing device satisfies a predetermined condition and, in a case where the reception characteristic satisfies the predetermined condition, causes the information processing device to transmit the information regarding the communication state.

(4)

The communication control device according to any one of claims (1) to (3), in which the control unit performs control to notify the information processing device of period information for specifying a start and an end of the period.

(5)

The communication control device according to item (4), in which the control unit notifies the information processing device, as the period information, of at least one of start time of the period and a sequence number for starting the period and at least one of the period and end time of the period.

(6)

The communication control device according to any one of items (1) to (5), in which the control unit performs control to notify the information processing device of notification period information for specifying a notification period during which the information processing device can notify the communication control device of the information regarding the communication state.

(7)

The communication control device according to item (6), in which the control unit notifies, as the notification period information, the information processing device of start time of the notification period and at least one of a duration of the notification period and end time of the notification period.

(8)

The communication control device according to any one of items (1) to (7), in which the control unit performs control to allow information regarding a reception characteristic in the information processing device to be notified as the information regarding the communication state.

(9)

The communication control device according to item (8), in which the information regarding the reception characteristic includes at least one of a throughput, a packet loss rate, the number of multicast packets successfully received by the information processing device and addressed to a multicast group to which the information processing device belongs, and a ratio of a sum of noise power and interference power relative to a desired signal power.

(10)

The communication control device according to any one of items (1) to (9), in which the control unit performs control to notify the information processing device of an identifier of an index indicating a reception characteristic in the information processing device, the identifier being information for specifying the information regarding the communication state.

(11)

The communication control device according to any one of items (1) to (10), in which the control unit performs control to include at least one of the information regarding the period, information for specifying the information regarding the communication state, and notification period information for specifying a notification period during which the communication control device can be notified in a Radio Measurement Request frame or a part of a concatenated frame in which a plurality of frames are concatenated to transmit the information to the information processing device.

(12)

An information processing device, including a control unit for performing control to transmit, to a communication control device, information regarding a communication state in the information processing device acquired in a period notified from the communication control device.

(13)

The information processing device according to item (12), in which the control unit transmits the information regarding the communication state to the communication control device in a case where the acquired information regarding the communication state satisfies a predetermined condition.

(14)

The information processing device according to item (12) or (13), in which the control unit includes information regarding a reception characteristic in the information processing device as the information regarding the communication state.

(15)

The information processing device according to items (14), in which the information regarding the reception characteristic is one of a value corresponding to an index indicating a reception characteristic in the information processing device and a value corresponding to an identifier of the index.

(16)

The information processing device according to any one of items (12) to (15), in which the control unit performs control to include the information regarding the communication state in a Radio Measurement Report frame or a Block Ack frame to transmit the information to the communication control device.

(17)

An information processing method, including a control procedure of notifying an information processing device of a period for the information processing device to acquire information regarding a communication state in the information processing device, causing the information processing device to notify the information regarding the communication state acquired in the period, and determining a destination of a delivery confirmation request on the basis of the information regarding the communication state.

(18)

An information processing method, including a control procedure of transmitting, to a communication control device, information regarding a communication state in a device on which the control procedure is performed, the information acquired in a period notified from the communication control device.

(19)

A program for causing a computer to execute a control procedure of notifying an information processing device of a period for the information processing device to acquire information regarding a communication state in the information processing device, causing the information processing device to notify the information regarding the communication state acquired in the period, and determining a destination of a delivery confirmation request on the basis of the information regarding the communication state.

(20)

A program for causing a computer to execute a control procedure of transmitting, to a communication control device, information regarding a communication state of a device on which the control procedure is performed, the information acquired in a period notified from the communication control device.

REFERENCE SIGNS LIST

1 Wireless communication system
100 AP (wireless communication device)
110 Wireless communication unit
120 Storage unit
130 Control unit
200A to 200F STA (wireless communication device)
210 Wireless communication unit
220 Storage unit
230 Control unit
900 Smartphone
901 Processor
902 Memory
903 Storage
904 External coupling interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. A communication control device, comprising:
circuitry configured to:
notify a plurality of information processing devices of a period to acquire measurement information regarding a communication state in the plurality of information processing devices;
receive a notification from a first information processing device in the plurality of information processing devices, wherein the first information processing device determines to transmit the notification in a case that the measurement information acquired in the period satisfies a predetermined condition indicated by the communication control device; and
determine the first information processing device as a destination of a delivery confirmation request in the plurality of information processing devices, on the basis of the notification from the first information processing device.

2. The communication control device according to claim 1,
wherein the measurement information regarding the communication state acquired in the period by each of the plurality of information processing devices includes a reception characteristic information in each of the plurality of information processing devices, and
the circuitry is configured to receive the notification from the first information processing device, in a case where the reception characteristic information of the first information processing device satisfies the predetermined condition.

3. The communication control device according to claim 2, wherein the reception characteristic information includes at least one of a throughput, a packet loss rate, a number of multicast packets successfully received by the first information processing device and addressed to a multicast group to which the first information processing device belongs, and a ratio of a sum of noise power and interference power relative to a desired signal power.

4. The communication control device according to claim 1, wherein the circuitry is configured to notify the plurality of information processing devices of period information for specifying a start and an end of the period of measurement.

5. The communication control device according to claim 4, wherein the circuitry is configured to notify the plurality of information processing devices, as the period information, of at least one of start time of the period and a sequence number for starting the period of the measurement and at least one of a duration of the period and end time of the period of the measurement.

6. The communication control device according to claim 1, wherein the circuitry is configured to notify the plurality of information processing devices of notification period information for specifying a notification period during which at least one of the plurality of information processing devices can notify the communication control device of information regarding the communication state as the notification.

7. The communication control device according to claim 6, wherein the circuitry is configured to notify the plurality of information processing devices, as the notification period information, of start time of the notification period and at least one of a duration of the notification period and end time of the notification period.

8. The communication control device according to claim 1, wherein the circuitry is configured to receive the notification by using an alert frame from the first information processing device.

9. The communication control device according to claim 1, wherein the circuitry is configured to notify the plurality of information processing devices of an identifier of an index indicating a reception characteristic in the plurality of information processing devices, the identifier being information for specifying the information regarding the communication state.

10. The communication control device according to claim 1, wherein the circuitry is configured to include at least one of the information regarding the period, information for specifying the measurement information regarding the communication state, and notification period information for specifying a notification period during which the communication control device can be notified, in a Radio Measurement Request frame or a part of a concatenated frame in which a plurality of frames are concatenated, to transmit to the plurality of information processing devices.

11. The communication control device according to claim 1, wherein the circuitry is configured to receive the notification from the first information processing device, only in a case that the first information processing device determines that the measurement information acquired in the period does not exceed a threshold of reception characteristic indicated by the communication control device.

12. The communication control device according to claim 1, wherein the circuitry is configured to receive the notification from the first information processing device, only in a case that the first information processing device determines that the measurement information acquired in the period does not exceed a first threshold of reception characteristic indicated by the communication control device.

13. The communication control device according to claim 12, wherein the circuitry dose not receive the notification from the first information processing device, in a case that the first information processing device determines that the measurement information acquired in the period does not exceed a second threshold of reception characteristic indicated by the communication control device, the second threshold of the reception characteristic being smaller than the first threshold of the reception characteristic.

14. The communication control device according to claim 1, wherein the circuitry is configured to change a number of the destination of a delivery confirmation request in the plurality of information processing devices, based on congestion degree information included in the notification received from the first information processing device.

15. An information processing device, comprising:
circuitry configured to:
receive period information from a communication control device, the period information being for acquiring measurement information regarding a communication state in the information processing device;
transmit a notification to the communication control device, when the circuitry determines that the measurement information acquired in the period satisfies a predetermined condition indicated by the communication control device, the communication control device determining the information processing device as a destination of a delivery confirmation request in a group of information processing devices, on the basis of the notification from the information processing device.

16. The information processing device according to claim 15, wherein the measurement information regarding the communication state acquired in the period by the information processing device includes a reception characteristic information.

17. The information processing device according to claim 16, wherein the reception characteristic information is one of a value corresponding to an index indicating a reception characteristic in the information processing device and a value corresponding to an identifier of the index.

18. The information processing device according to claim 15, wherein the circuitry is configured to include the information regarding the communication state in a Radio Measurement Report frame or a Block Ack frame to transmit the information to the communication control device.

19. The information processing device according to claim 15, wherein the circuitry is configured to transmit the notification to the communication control device, only in a case that the circuitry determines that the measurement information acquired in the period does not exceed a first threshold of reception characteristic indicated by the communication control device.

20. An information processing method, comprising:
- notifying a plurality of information processing devices of a period to acquire measurement information regarding a communication state in the plurality of information processing devices;
- receiving a notification from a first information processing device in the plurality of information processing devices, wherein the first information processing device determines to transmit the notification in a case that the measurement information acquired in the period satisfies a predetermined condition indicated by the communication control device; and
- determining the first information processing device as a destination of a delivery confirmation request in the plurality of information processing devices, on the basis of the notification from the first information processing device.

* * * * *